US012462965B2

(12) United States Patent
Wang et al.

(10) Patent No.: US 12,462,965 B2
(45) Date of Patent: Nov. 4, 2025

(54) COIL DEVICE

(71) Applicant: TDK CORPORATION, Tokyo (JP)

(72) Inventors: Chen Wang, Tokyo (JP); Satoshi Sugimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 400 days.

(21) Appl. No.: 17/318,358

(22) Filed: May 12, 2021

(65) Prior Publication Data

US 2021/0358676 A1 Nov. 18, 2021

(30) Foreign Application Priority Data

May 14, 2020 (JP) ................................ 2020-085480

(51) Int. Cl.

| | |
|---|---|
| ***H01F 3/14*** | (2006.01) |
| ***H01F 17/04*** | (2006.01) |
| ***H01F 27/245*** | (2006.01) |
| ***H01F 27/28*** | (2006.01) |

(52) U.S. Cl.

CPC ............ *H01F 27/28* (2013.01); *H01F 17/04* (2013.01); *H01F 27/245* (2013.01)

(58) Field of Classification Search

CPC ........ H01F 27/28; H01F 17/04; H01F 27/245; H01F 27/2847; H01F 2027/348; H01F 3/14; H01F 27/341; H01F 17/043; H01F 27/34

See application file for complete search history.

(56) References Cited

U.S. PATENT DOCUMENTS

| | | | | |
|---|---|---|---|---|
| 4,309,655 | A | 1/1982 | Lienhard et al. | |
| 4,672,358 | A | 6/1987 | Pryst et al. | |
| 6,765,468 | B2 | 7/2004 | Chen et al. | |
| 7,248,139 | B1 | 7/2007 | Podlisk et al. | |
| 8,896,404 | B2 | 11/2014 | Won et al. | |
| 11,004,592 | B2 | 5/2021 | Bellur et al. | |
| 11,424,068 | B2 | 8/2022 | Toyama et al. | |
| 11,437,184 | B2 | 9/2022 | Mori et al. | |
| 11,587,717 | B2 | 2/2023 | Wang et al. | |
| 11,967,452 | B2 | 4/2024 | Wang et al. | |
| 2004/0160298 | A1 | 8/2004 | Hsu et al. | |
| 2007/0176725 | A1 | 8/2007 | Podlisk et al. | |
| 2008/0169893 | A1* | 7/2008 | Sullivan .............. | H01F 27/2847 335/297 |
| 2014/0152415 | A1 | 6/2014 | Kawashima | |
| 2015/0009004 | A1 | 1/2015 | Zhou et al. | |

(Continued)

FOREIGN PATENT DOCUMENTS

| | | |
|---|---|---|
| CN | 204680522 U | 9/2015 |
| CN | 205194485 U | 4/2016 |

(Continued)

OTHER PUBLICATIONS

Feb. 29, 2024 Office Action issued in U.S. Appl. No. 17/318,637.

(Continued)

*Primary Examiner* — Tuyen T Nguyen
(74) *Attorney, Agent, or Firm* — Oliff PLC

(57) ABSTRACT

A coil device includes a first core, a second core, and a conductor. The first core includes a first leg. The second core is disposed with a gap between the first leg and the second core. The conductor is at least partly disposed between the first core and the second core. A notch is formed on the conductor at a position corresponding to the gap.

19 Claims, 21 Drawing Sheets

(56) References Cited

U.S. PATENT DOCUMENTS

| | | | | |
|---|---|---|---|---|
| 2017/0011836 | A1 | 1/2017 | Ma et al. | |
| 2017/0178794 | A1 | 6/2017 | Yan et al. | |
| 2017/0345545 | A1 | 11/2017 | Liu et al. | |
| 2018/0158594 | A1 | 6/2018 | Bellur et al. | |
| 2018/0336986 | A1* | 11/2018 | Xin | H01F 17/06 |
| 2019/0027288 | A1 | 1/2019 | Sato et al. | |
| 2019/0066910 | A1 | 2/2019 | Peng et al. | |
| 2019/0237245 | A1 | 8/2019 | Ashizawa et al. | |
| 2019/0272945 | A1 | 9/2019 | Arai et al. | |
| 2019/0272946 | A1 | 9/2019 | Arai et al. | |
| 2020/0279688 | A1 | 9/2020 | Toyama et al. | |
| 2021/0358678 | A1 | 11/2021 | Wang et al. | |
| 2022/0369464 | A1 | 11/2022 | Huang et al. | |

FOREIGN PATENT DOCUMENTS

| | | | | | |
|---|---|---|---|---|---|
| CN | 113674971 | A | | 11/2021 | |
| CN | 115621010 | A | | 1/2023 | |
| CN | 120048616 | A | | 5/2025 | |
| DE | 10 2019 215 525 | A1 | | 4/2021 | |
| JP | S62-213226 | A | | 9/1987 | |
| JP | S63-032901 | A | | 2/1988 | |
| JP | 2004-87607 | A | | 3/2004 | |
| JP | 2005-129589 | A | | 5/2005 | |
| JP | 2005-129590 | A | | 5/2005 | |
| JP | 2007-184509 | A | | 7/2007 | |
| JP | 2010-073523 | A | | 4/2010 | |
| JP | 2015-015470 | A | | 1/2015 | |
| JP | 2019-129253 | A | | 8/2019 | |
| JP | 2019-134147 | A | | 8/2019 | |
| JP | 2019-153644 | A | | 9/2019 | |
| JP | 2020-145414 | A | | 9/2020 | |
| TW | I677887 | B | | 11/2019 | |
| TW | M585974 | U | | 11/2019 | |
| TW | I690953 | B | | 4/2020 | |
| WO | WO-9217892 | A1 | * | 10/1992 | H01F 27/346 |
| WO | WO-2005096330 | A1 | * | 10/2005 | H01F 27/2847 |
| WO | 2019/119046 | A1 | | 6/2019 | |

OTHER PUBLICATIONS

Dec. 20, 2023 Notice of Allowance issued in U.S. Appl. No. 17/404,146.

Sep. 1, 2023 Office Action issued in U.S. Appl. No. 17/404,146.

Jan. 16, 2025 Non-Final Rejection received in U.S. Appl. No. 18/593,402.

Jul. 29, 2025 Notice of Allowance issued in U.S. Appl. No. 18/593,402.

* cited by examiner

COIL DEVICE

BACKGROUND OF THE INVENTION

The present invention relates to a coil device used as, for example, an inductor.

As a coil device used as an inductor or so, for example, a coil device described in Patent Document 1 is known. The coil device described in Patent Document 1 includes a first core member, a core body disposed with a gap to the first core member, and a conductor attached to the core body so as to face the gap. In the coil device described in Patent Document 1, the conductor is disposed separately from the gap by changing the shape of the core body at the attachment position of the conductor. As a result, the leakage magnetic flux generated in the gap is less likely to hit the surface of the conductor. Thus, the eddy current is less likely to be generated in the surface of the conductor, and the generation of AC loss due to the eddy current can be prevented.

In the coil device described in Patent Document 1, however, since the shape of the core body is changed, the volume of the core body may be reduced, and inductance characteristics may be deteriorated.

Patent Document 1: JP2019129253 (A)

BRIEF SUMMARY OF INVENTION

The present invention has been achieved under such circumstances. It is an object of the invention to provide a coil device being capable of preventing the generation of AC loss and having favorable inductance characteristics To achieve the above object, a coil device according to the present invention comprises:

a first core including a first leg;

a second core disposed with a gap between the first leg and the second core; and a conductor at least partly disposed between the first core and the second core, wherein a notch is formed on the conductor at a position corresponding to the gap.

In the coil device according to the present invention, a notch is formed on the conductor at a position corresponding to the gap. Thus, at the position corresponding to the gap, a surface of the conductor is disposed at a position separated from the gap by a distance corresponding to the depth of the notch, and the leakage magnetic flux generated in the gap is less likely to hit the surface of the conductor. Thus, the eddy current is less likely to be generated in the surface of the conductor, and the generation of AC loss due to the eddy current can be prevented.

In the coil device according to the present invention, since the notch is formed on the conductor at the position corresponding to the gap, unlike the prior arts, the shape of the first core or the second core may not be changed so as to prevent the leakage magnetic flux generated in the gap from hitting the surface of the conductor. Thus, the volume of the first core or the second core can be secured sufficiently, and the coil device can have favorable inductance characteristics.

Preferably, the notch is formed on the conductor along an edge of the first leg next to the conductor. In this structure, at each part of the gap extending along the edge of the first leg, the leakage magnetic flux generated in the gap is less likely to hit the surface of the conductor, and the generation of eddy current can effectively be prevented in the surface of the conductor.

Preferably, a depth of the notch is larger than a width of the gap. In this structure, at the position corresponding to the gap, the surface of the conductor can be disposed sufficiently separately from the gap. Thus, the leakage magnetic flux generated in the gap is less likely to hit the surface of the conductor, and the generation of eddy current can effectively be prevented in the surface of the conductor.

The second core may include a second leg disposed opposite to the first leg, and the notch may be formed on the conductor at a position corresponding to the gap formed between the first leg and the second leg. In this structure, the above-mentioned various effects can be obtained in the coil device including, for example, what is called an EE or UU type core.

Preferably, the notch may be made of a concave groove. In this structure, when the gap is formed between the first leg and the second leg, the notch can be disposed at a position opposite to the gap. Thus, the leakage magnetic flux generated in the gap is less likely to hit the surface of the conductor, and the generation of eddy current can effectively be prevented in the surface of the conductor.

The second core may have a flat plate shape, and the notch may be formed on the conductor at the position corresponding to the gap formed between the first leg and the second core. In this structure, the above-mentioned various effects can be obtained in the coil device including, for example, what is called an EI type core.

Preferably, the notch is made of a chamfered portion obtained by chamfering a side of the conductor. In this structure, when the gap is formed between the first leg and the second core having a flat plate shape, the notch can be disposed at the position corresponding to the gap. Thus, the leakage magnetic flux generated in the gap is less likely to hit the surface of the conductor, and the generation of eddy current can effectively be prevented in the surface of the conductor.

The first leg may include a pair of outer legs and a middle leg disposed between the pair of outer legs, and the notch may be formed on the conductor at the position corresponding to the gap formed between the second core and at least either one of the outer legs and the middle leg. In this structure, the above-mentioned various effects can be obtained in the coil device including, for example, what is called an EE or EI type core.

The conductor may have a curved shape, and the notch may be formed on at least either one of an inner circumferential side and an outer circumferential side of the conductor. For example, when the first leg includes the outer legs and the middle leg, and when the notch is formed on the outer circumferential side of the conductor, the leakage magnetic flux generated in the gap formed between the outer legs and the second core is less likely to hit the outer circumferential side of the conductor, and the generation of eddy current can effectively be prevented in the surface of the conductor. When the notch is formed on the inner circumferential side of the conductor, the leakage magnetic flux generated in the gap formed between the middle leg and the second core is less likely to hit the inner circumferential side of the conductor, and the generation of eddy current can effectively be prevented in the surface of the conductor.

Preferably, the conductor may include a mounting part for connecting to an external circuit, and the notch may partly be formed in the mounting part. In this structure, the leakage magnetic flux generated in the gap is less likely to hit the surface of the mounting part, and the generation of eddy current can effectively be prevented in the surface of the conductor.

DETAILED DESCRIPTION OF INVENTION

Hereinafter, the present invention is explained based on embodiments shown in the figures.

First Embodiment

Figure 1A:
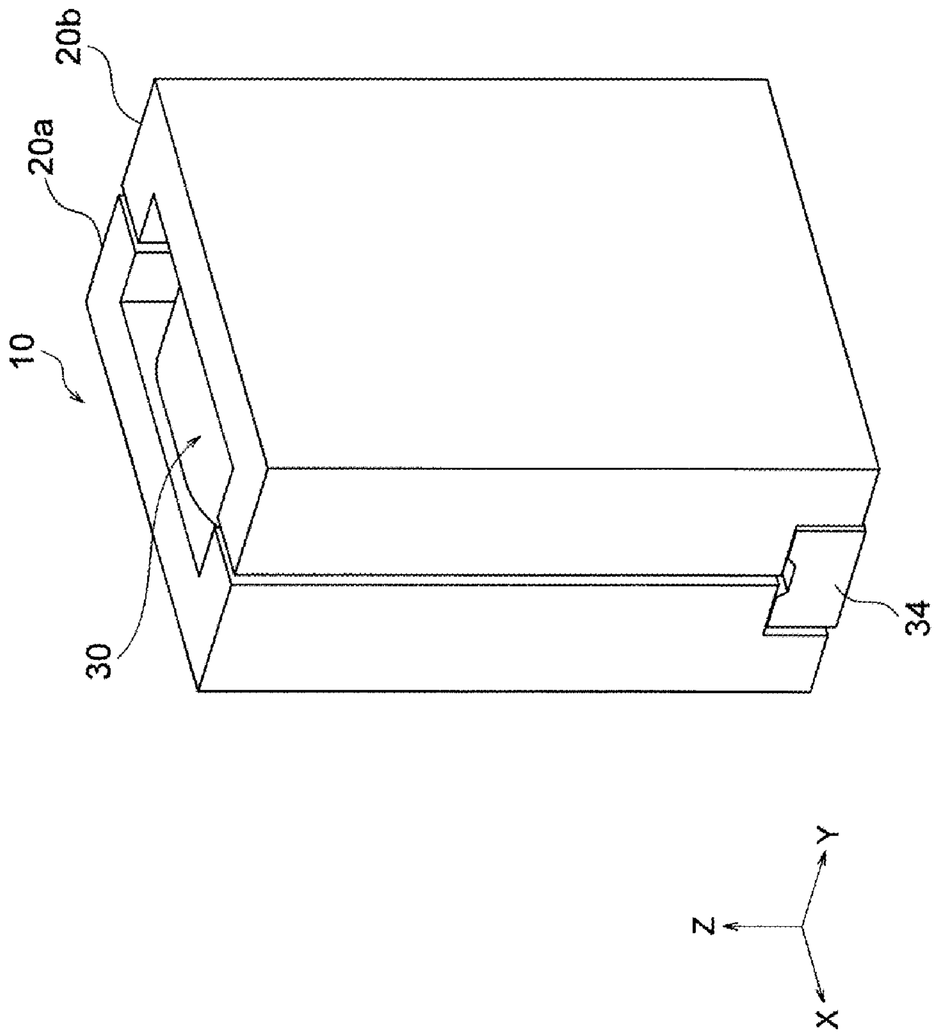
FIG. 1A is a perspective view of a coil device according to First Embodiment of the present invention.

As shown in FIG. 1A, a coil device 10 is, for example, an inductor and includes a first core 20*a*, a second core 20*b*, and a conductor 30. Preferably, the coil device 10 has a width of 3.0-20.0 mm in the X-axis direction, a width of 3.0-20.0 mm in the Y-axis direction, and a width of 3.0-20.0 mm in the Z-axis direction.

Figure 2:
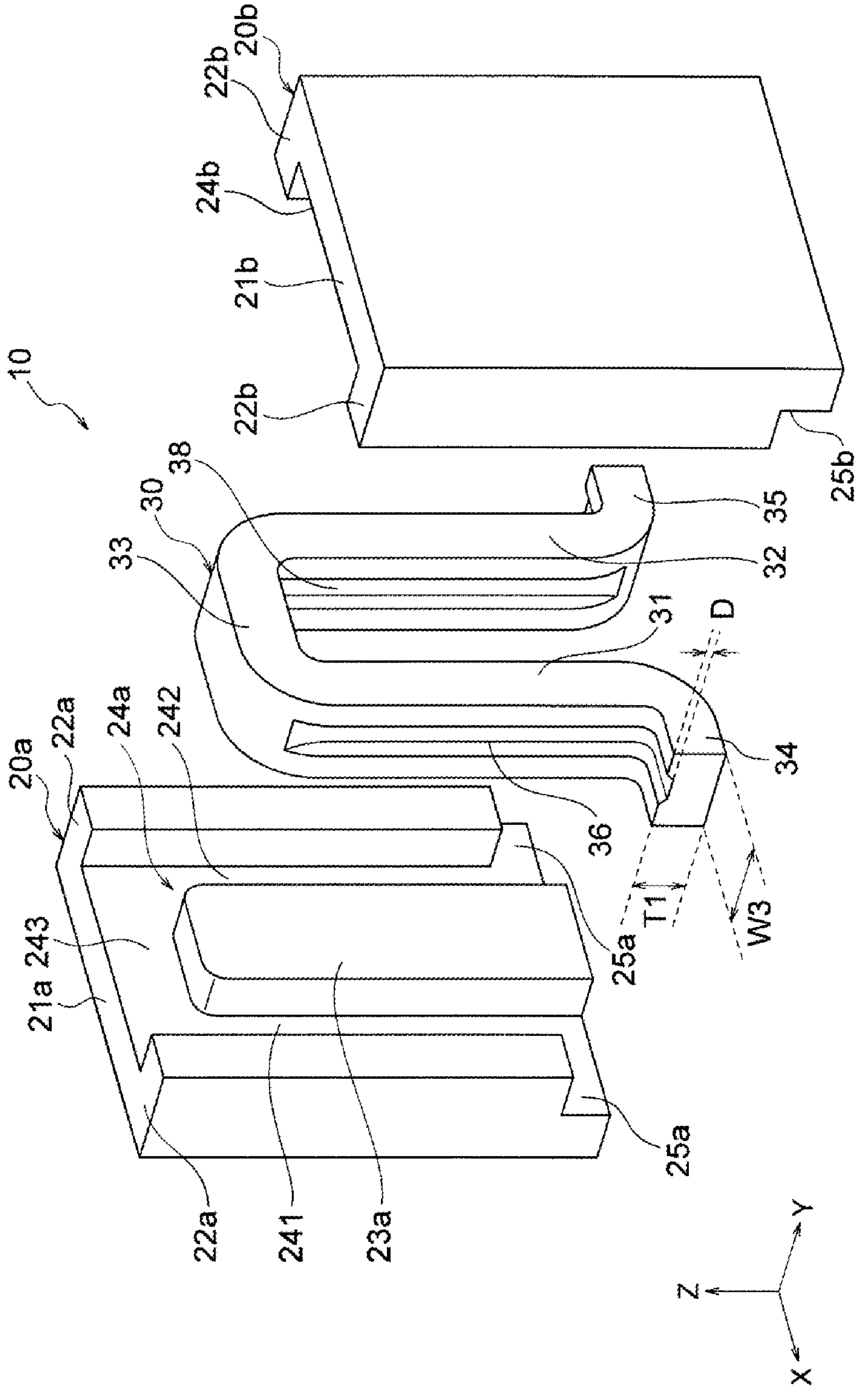
FIG. 2 is an exploded perspective view of the coil device shown in FIG. 1A.

As shown in FIG. 2, a first core 20*a* and a second core 20*b* have the same shape and have what is called an E shape. The first core 20*a* and the second core 20*b* are arranged to face each other in the Y-axis direction and are joined with adhesive agent or so. The first core 20*a* and the second core

20*b* are made of magnetic material and are manufactured by molding and sintering, for example, a magnetic material having a comparatively high permeability, such as Ni—Zn based ferrite and Mn—Zn based ferrite, or a magnetic powder made of metal magnetic material.

The first core 20*a* includes a first base 21*a*, a first groove 24*a*, first side grooves 25*a* and 25*a*, and a first leg. In the present embodiment, as the first leg, the first core 20*a* includes a pair of first outer legs 22*a* and 22*a* and a first middle leg 23*a* disposed between the pair of first outer legs 22*a* and 22*a*. The first base 21*a* has a substantially flat plate shape (substantially rectangular parallelepiped shape).

The pair of first outer legs 22*a* and 22*a* is formed at one end and the other end of the first base 21*a* in the X-axis direction with a predetermined interval in the X-axis direction. The first outer legs 22*a* and 22*a* protrude from one surface of the first base 21*a* in the Y-axis direction toward one side in the Y-axis direction by a predetermined length. The first outer legs 22*a* and 22*a* have an elongated shape in the Z-axis direction and extend from the upper end to the lower end of the first base 21*a* in the Z-axis direction.

The first middle leg 23*a* is formed at an approximately central part of the first base 21*a* in the X-axis direction. The first middle leg 23*a* protrudes from one surface of the first base 21*a* in the Y-axis direction toward one side in the Y-axis direction by a predetermined length. The first middle leg 23*a* has an elongated shape in the Z-axis direction and extends from an upper point (a point lower than the upper end by about the thickness of the conductor 30) to the lower end of the first base 21*a* in the Z-axis direction. The protrusion width of the first middle leg 23*a* in the Y-axis direction is substantially equal to that of the first outer legs 22*a* and 22*a* in the Y-axis direction. In the illustrated example, the width of the first middle leg 23*a* in the X-axis direction is larger than that of the first outer leg 22*a* (22*a*) in the X-axis direction and is approximately twice as large as that of the first outer leg 22*a* (22*a*) in the X-axis direction.

The first groove 24*a* has a shape corresponding to that of the conductor 30 (approximately U shape) and extends along the circumference of the first middle leg 23*a*. The conductor 30 can be disposed in the first groove 24*a*. The first groove 24*a* includes a first side part 241, a second side part 242, and an upper part 243.

The first side part 241 and the second side part 242 extend substantially linearly in the Z-axis direction from the upper end to the lower end of the first base 21*a* in the Z-axis direction. The first side part 241 is formed between the first outer leg 22*a* located on one side in the X-axis direction and the first middle leg 23*a*, and the second side part 242 is formed between the first outer leg 22*a* located on the other side in the X-axis direction and the first middle leg 23*a*. The width of the side part 241 (242) in the X-axis direction is as large as or larger than the thickness (plate thickness) of the conductor 30. As mentioned below, a first conductor side part 31 of the conductor 30 is disposed in the first side part 241, and a second conductor side part 32 of the conductor 30 is disposed in the second side part 242.

The upper part 243 is formed in an upper part of the first base 21*a* and extends in the X-axis direction. The upper part 243 connects the upper end of the first side part 241 and the upper end of the second side part 242. The width of the upper part 243 in the Z-axis direction is as large as or larger than the thickness (plate thickness) of the conductor 30. As mentioned below, a conductor upper part 33 of the conductor 30 is disposed in the upper part 243.

The pair of first side grooves 25*a* and 25*a* is formed below the first outer legs 22*a* and 22*a* located on one side and the other side in the X-axis direction and extends in the X-axis direction toward one end and the other end of the first base 21*a* in the X-axis direction. The first side groove 25*a* (25*a*) is connected to the lower end of the side part 241 (242) and is a substantially L-shaped groove formed by the side part 241 (242) and the first side groove 25*a* (25*a*). The width of the first side groove 25*a* (25*a*) in the Z-axis direction is as large as or larger than the thickness (plate thickness) of the conductor 30. As mentioned below, mounting parts 34 and 35 of the conductor 30 are arranged in the first side grooves 25*a* and 25*a*.

When the conductor 30 is disposed in the first groove 24*a*, the first middle leg 23*a* is disposed on the inner side of the conductor 30, and the first outer legs 22*a* and 22*a* are arranged on the outer side of the conductor 30.

Figure 1B:
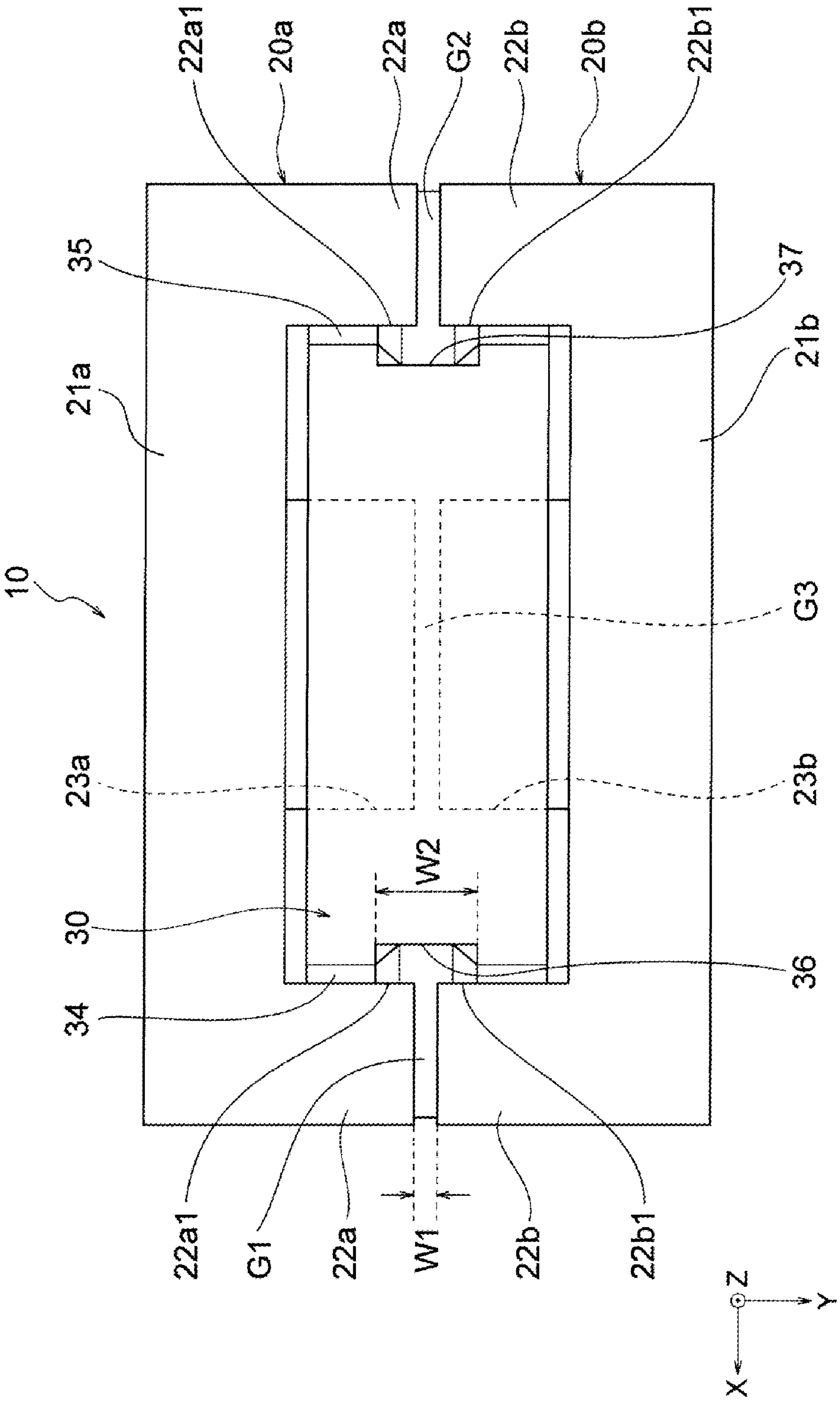
FIG. 1B is a plane view of the coil device shown in FIG. 1A.
Figure 1C:
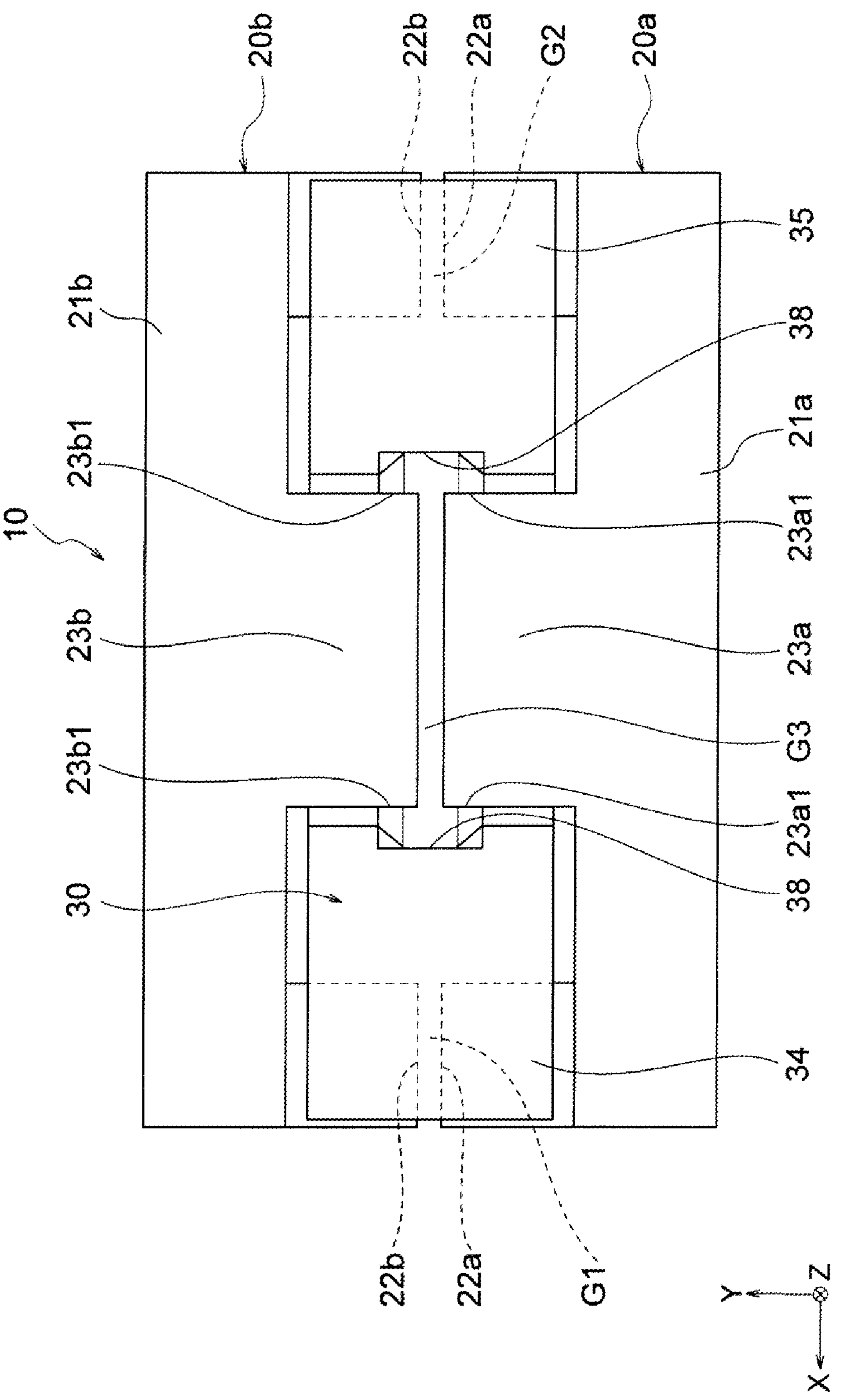
FIG. 1C is a bottom view of the coil device shown in FIG. 1A.

The second core 20*b* includes a second base 21*b*, a second groove 24*b*, second side grooves 25*b* and 25*b*, and a second leg. In the present embodiment, as the second leg, the second core 20*b* includes a pair of second outer legs 22*b* and 22*b* and a second middle leg 23*b* disposed between the pair of second outer legs 22*b* and 22*b* (FIG. 1B and FIG. 1C). The second leg (the second outer legs 22*b* and 22*b* and the second middle leg 23*b*) is disposed to face the first leg (the first outer legs 22*a* and 22*a* and the first middle leg 23*a*). The shape of the second core 20*b* is similar to that of the first core 20*a*. Thus, the shape of each part of the second core 20*b* is not explained.

As shown in FIG. 1B, the first core 20*a* and the second core 20*b* can be combined by joining one surface of the first core 20*a* located opposite to the first base 21*a* in the Y-axis direction and one surface of the second core 20*b* located opposite to the second base 21*b* in the Y-axis direction via adhesive agent or so (not illustrated). For more detail, the outer legs 22*a* and 22*b* and/or the middle legs 23*a* and 23*b* of the cores 20*a* and 20*b* are joined.

When the first core 20*a* and the second core 20*b* are combined while facing each other in the Y-axis direction, gaps G1 and G2 each having a predetermined width in the Y-axis direction are formed between the first core 20*a* and the second core 20*b* at a position where the outer legs 22*a* and 22*b* are formed, and a gap G3 having a predetermined width in the Y-axis direction is formed at a position where the middle legs 23*a* and 23*b* are formed.

The gap G1 has a predetermined length in the X-axis direction and is formed between the outer legs 22*a* and 22*b* located on one side in the X-axis direction. The gap G2 has a predetermined length in the X-axis direction and is formed between the outer legs 22*a* and 22*b* located on the other side in the X-axis direction. The length of the gap G1 (G2) in the X-axis direction is equal to that of the outer leg 22*a* (22*b*) in the X-axis direction. The gap G1 (G2) also has a predetermined length in the Z-axis direction, and this length is equal to that of the outer leg 22*a* (22*b*) in the Z-axis direction.

The gap G3 has a predetermined length in the X-axis direction and is formed between the first middle leg 23*a* and the second middle leg 23*b*. The length of the gap G3 in the X-axis direction is equal to that of the middle leg 23*a* (23*b*) in the X-axis direction. In the illustrated example, the length of the gap G3 in the X-axis direction is larger than that of the gap G1 (G2) in the X-axis direction. The gap G3 also has a predetermined length in the Z-axis direction, and this length is equal to that of the first middle leg 23*a* (23*b*) in the Z-axis direction. The gaps G1-G3 are formed on the same line along the boundary between the first core 20*a* and the second core 20*b*.

The width W1 of the gap G1 in the Y-axis direction is preferably 0.1-1.0 mm, more preferably 0.1-0.5 mm. This is also the case with the gap G2 and the gap G3 in the Y-axis direction. Incidentally, the gaps G1-G3 may have mutually different widths in the Y-axis direction.

As shown in FIG. 2, the conductor 30 is made of a conductive plate and has a curved shape (approximately U shape). The conductor 30 is disposed between the first core 20*a* and the second core 20*b*. The conductor 30 is made of, for example, a good conductor, such as copper, copper alloy, silver, and nickel, but may be any conductive material. The conductor 30 is manufactured by, for example, machining a metal plate, but may be manufactured by any other method. In the illustrated example, the conductor 30 has a vertically long shape, and the height of the conductor 30 in the Z-axis direction is larger than the length of the conductor 30 in the X-axis direction.

The conductor 30 includes a first conductor side part 31, a second conductor side part 32, a conductor upper part 33, a first mounting part 34, and a second mounting part 35. The first conductor side part 31 and the second conductor side part 32 extend in the Z-axis direction. In the conductor 30, the first conductor side part 31 side functions as an input terminal (or an output terminal), and the second conductor side part 32 side functions as an output terminal (or an input terminal). The conductor upper part 33 extends in the X-axis direction and connects the first conductor side part 31 and the second conductor side part 32.

The first mounting part 34 and the second mounting part 35 are formed at one end and the other end of the conductor 30, respectively. That is, the mounting part 34 (35) is formed continuously (integrally) to the lower end of the conductor side part 31 (32). The conductor 30 can be connected to an external circuit (not illustrated) of a mounting board via the mounting parts 34 and 35. The mounting part 34 (35) is bent substantially perpendicularly to the conductor side part 31 (32) and extends outward in the X-axis direction. The conductor 30 is joined with an external circuit (not illustrated) via a connection member, such as solder and conductive adhesive agent.

As shown in FIG. 1A and FIG. 1C, the end of the mounting part 34 (35) is exposed outward from the side of the core 20*a* (20*b*) in the X-axis direction. Likewise, as shown in FIG. 1C, the lower surface of the mounting part 34 (35) is exposed outward from the bottom of the core 20*a* (20*b*). Since the mounting parts 34 and 35 are exposed in such a manner, the heat generated in the surroundings of the mounting parts 34 and 35 can efficiently be released to the outside of the cores 20*a* and 20*b*.

Figure 3A:
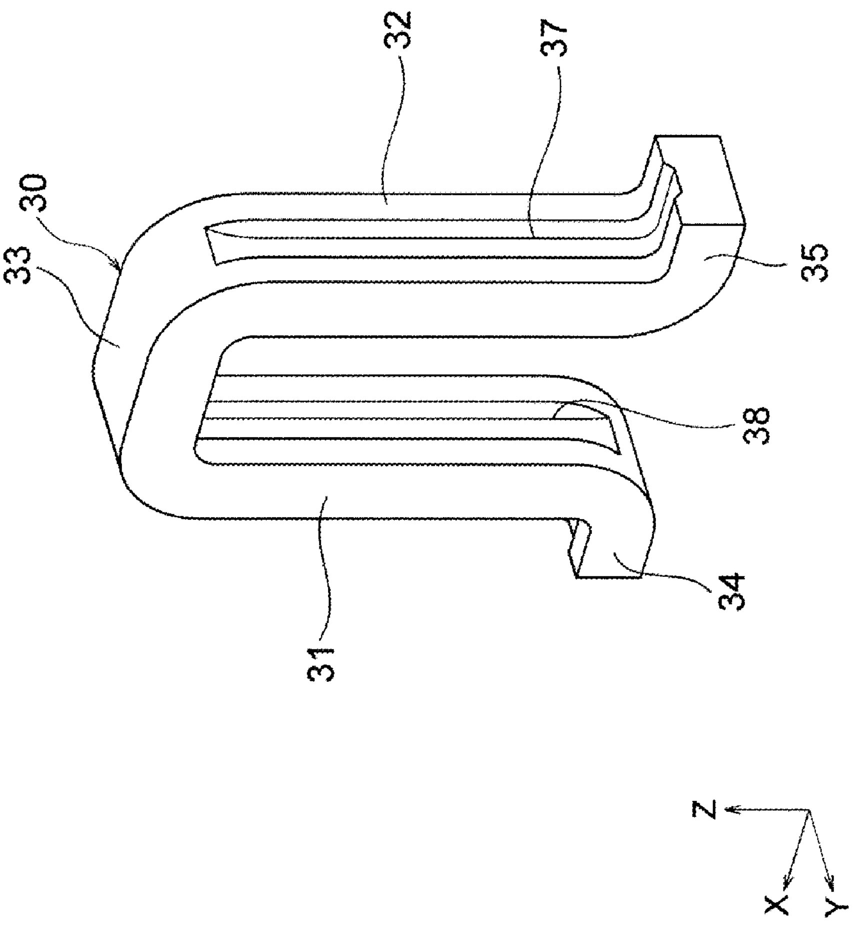
FIG. 3A is a perspective view of a coil shown in FIG. 2.

In the present embodiment, as shown in FIG. 2 and FIG. 3A, the conductor 30 includes notches. For more detail, a first outer notch 36 and a second outer notch 37 are formed on the outer circumferential side (front surface) of the conductor 30, and an inner notch 38 is formed on the inner circumferential side (back surface) of the conductor 30.

The first outer notch 36 is formed on the front surfaces of the first conductor side part 31 and the first mounting part 34 and extends in the extending direction (longitudinal direction) of the first conductor side part 31 and the first mounting part 34. The first outer notch 36 is made of a concave groove, and taper surfaces are formed on the inside of the concave groove. The shape of the first outer notch 36 is the same as that of the first conductor side part 31 and the first mounting part 34 and is an approximately L shape. The first outer notch 36 is formed at an approximately central part of the first conductor side part 31 and the first mounting part 34 in the Y-axis direction and continuously extends from the upper end of the first conductor side part 31 to the end of the first mounting part 34.

The second outer notch 37 is formed on the front surfaces of the second conductor side part 32 and the second mounting part 35 and extends in the extending direction (longitudinal direction) of the second conductor side part 32 and the second mounting part 35. The second outer notch 37 is made of a concave groove, and taper surfaces are formed on the inside of the concave groove. The shape of the second outer notch 37 is the same as that of the second conductor side part 32 and the second mounting part 35 and is an approximately L shape. The second outer notch 37 is formed at an approximately central part of the second conductor side part 32 and the second mounting part 35 in the Y-axis direction and continuously extends from the upper end of the second conductor side part 32 to the end of the second mounting part 35.

The outer notch 36 (37) is formed so that the width of the outer notch 36 (37) in the Y-axis direction becomes smaller in the depth direction. Incidentally, the outer notch 36 (37) may have any other shapes. For example, the taper surfaces may not be formed.

As shown in FIG. 1B and FIG. 2, the outer notch 36 (37) is formed on the conductor 30 at a position corresponding to the gap G1 (G2) (a position close to the gap G1 (G2)). For more detail, the outer notch 36 (37) is formed on the conductor side part 31 (32) so as to extend in the Z-axis direction along an outer leg edge 22*a*1 (22*b*1) of the outer leg 22*a* (22*b*) next to the conductor 30, and the outer notch 36 (37) is formed on the mounting part 34 (35) so as to extend in the X-axis direction along the lower end of the outer leg 22*a* (22*b*).

The first outer notch 36 is opposite to (faces) the other end of the gap G1 in the X-axis direction. At the position corresponding to the gap G1, the surface of the conductor 30 and the other end of the gap G1 in the X-axis direction are away from each other by a distance corresponding to the depth D of the first outer notch 36. The second outer notch 37 is opposite to one end of the gap G2 in the X-axis direction. At the position corresponding to the gap G2, the surface of the conductor 30 and one end of the gap G2 in the X-axis direction is away from each other by a distance corresponding to the depth of the second outer notch 37.

The width of the outer notch 36 (37) in the Y-axis direction is larger than that of the gap G1 (G2) in the Y-axis direction. The ratio W2/W1 of the width W2 of the first outer notch 36 in the Y-axis direction to the width W1 of the gap G1 in the Y-axis direction is preferably 0.5-10, more preferably 1-7, still more preferably 3-5. This is also the case with the ratio of the width of the second outer notch 37 in the Y-axis direction to the width of the gap G2 in the Y-axis direction.

The ratio W2/W3 of the width W2 of the first outer notch 36 in the Y-axis direction to the width W3 of the conductor 30 in the Y-axis direction is preferably 0.2-0.8, more preferably 0.3-0.5. This is also the case with the ratio of the width of the second outer notch 37 in the Y-axis direction to the width of the conductor 30 in the Y-axis direction.

The ratio D/T1 of the depth D of the first outer notch 36 to the thickness T1 of the conductor 30 is preferably 0.1-0.5, more preferably 0.2-0.4. This is also the case with the ratio of the depth of the second outer notch 37 to the thickness T1 of the conductor 30.

Preferably, the relation between the depth D of the first outer notch 36 and the width W1 of the gap G1 in the Y-axis direction satisfies D>W1, but may not satisfy this. The ratio D/W1 of the depth D to the width W1 is preferably 0.5-5, more preferably 1-3. This is also the case with the relation between the depth of the second outer notch 37 and the width of the gap G2 in the Y-axis direction.

In the present embodiment, at the position corresponding to the gaps G1 and G2, the leakage magnetic flux generated in the gaps G1 and G2 can be prevented from hitting the conductor side parts 31 and 32 and the mounting parts 34 and 35 by determining each value of W2/W1, W2/W3, D/T1, and D/W1 or satisfying D>W1.

Figure 3B:
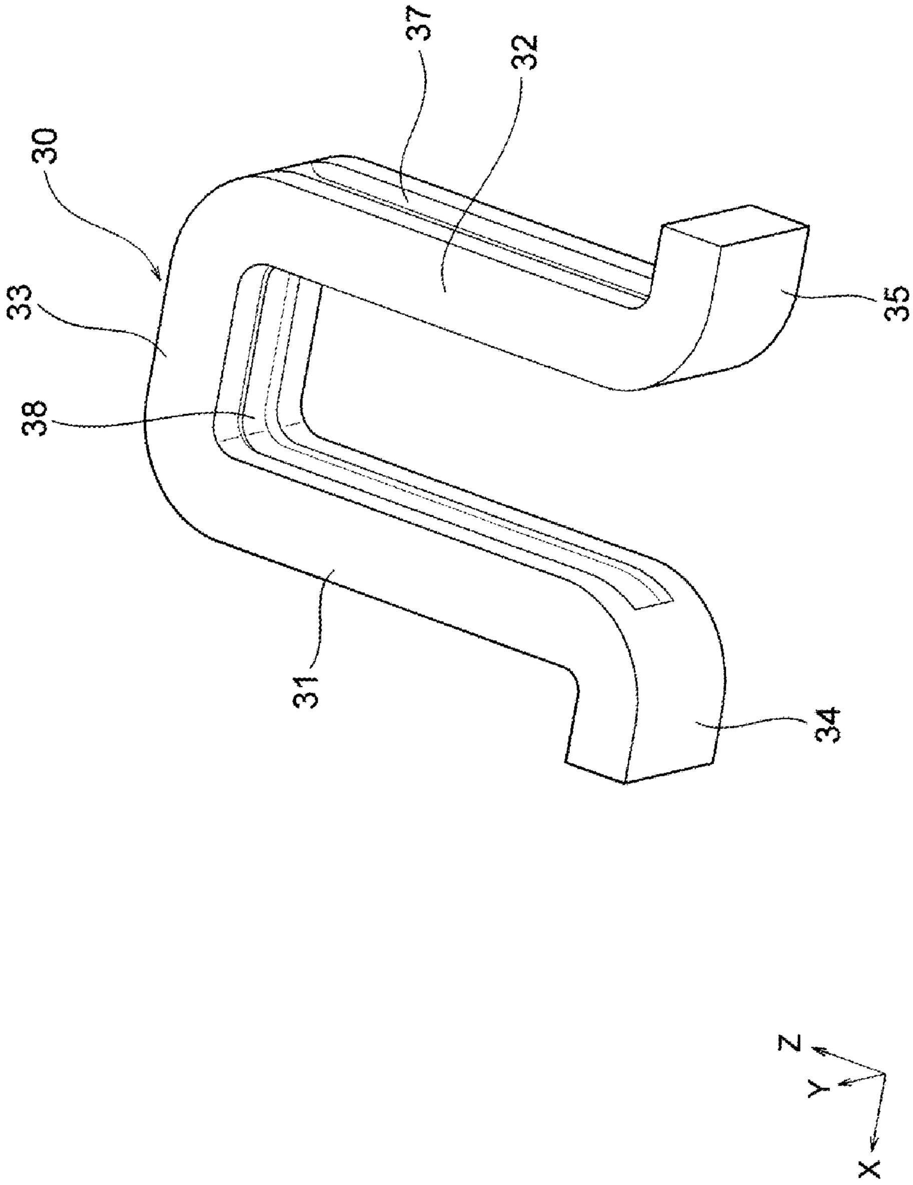
FIG. 3B is a perspective view of the coil shown in FIG. 3A from a different angle.

As shown in FIG. 2, FIG. 3A, and FIG. 3B, the inner notch 38 is formed on the back surfaces of the first conductor side part 31, the second conductor side part 32, and the conductor upper part 33 and extends along the extending direction (longitudinal direction) of the first conductor side part 31, the second conductor side part 32, and the conductor upper part 33. The inner notch 38 is made of a concave groove, and taper surfaces are formed on the inside of the concave groove. The shape of the inner notch 38 is the same as that of the first conductor side part 31, the second conductor side part 32, and the conductor upper part 33 and is an approximately U shape. The inner notch 38 is formed at an approximately central part of the first conductor side part 31, the second conductor side part 32, and the conductor upper part 33 in the Y-axis direction and continuously extends from the lower end of the first conductor side part 31 to the lower end of the second conductor side part 32.

As shown in FIG. 1C and FIG. 2, the inner notch 38 is formed on the conductor 30 at a position corresponding to the gap G3 (a position close to the gap G3). For more detail, the inner notch 38 is formed in the conductor side parts 31 and 32 so as to extend in the Z-axis direction along a middle leg edge 23*a*1 (23*b*1) of the outer leg 23*a* (23*b*) next to the conductor 30. In addition, the inner notch 38 is formed in the conductor upper part 33 so as to extend in the X-axis direction along the upper ends of the middle legs 23*a* and 23*b*. That is, the inner notch 38 extends along the circumferential edges of the middle legs 23*a* and 23*b*.

The inner notch 38 is opposite to (faces) one end of the gap G3 in the X-axis direction. At the position corresponding to the gap G3, the surface of the conductor 30 and one end of the gap G3 in the X-axis direction are away from each other by a distance corresponding to the depth of the inner notch 38. The inner notch 38 is opposite to (faces) the other end of the gap G3 in the X-axis direction. At the position corresponding to the gap G3, the surface of the conductor 30 and the other end of the gap G3 in the X-axis direction are away from each other by a distance corresponding to the depth of the inner notch 38.

The depth of the inner notch 38 and the width of the inner notch 38 in the Y-axis direction are similar to the depth of the outer notch 37 (38) and the width of the outer notch 37 (38) in the Y-axis direction, respectively. Thus, at the position corresponding to the gap G3, the inner notch 38 can also prevent the leakage magnetic flux generated in the gap G3 from hitting the conductor side parts 31 and 32 and the conductor upper part 33 by applying the above-mentioned relation for the outer notches 36 and 37 (each value of W2/W1, W2/W3, D/T1, and D/W1 or D>W1).

In the manufacture of the coil device 10, the first core 20*a*, the second core 20*b*, and the conductor 30 shown in FIG. 2 are prepared. Then, one side of the conductor 30 in the Y-axis direction is accommodated into the first groove 24*a* (second groove 24*b*) of the first core 20*a* (second core 20*b*), the other side of the conductor 30 in the Y-axis direction is accommodated into the second groove 24*b* (first groove 24*a*) of the second core 20*b* (first core 20*a*), and the conductor 30 is sandwiched by the first core 20*a* and the second core 20*b*.

At this time, as shown in FIG. 1B, the first core 20*a* and the second core 20*b* are combined with a predetermined interval in the Y-axis direction so that: the gap G1 is formed between the outer legs 22*a* and 22*b* located on one side in the X-axis direction; the gap G2 is formed between the outer legs 22*a* and 22*b* located on the other side in the X-axis direction; and the gap G3 is formed between the first middle leg 23*a* and the second middle leg 23*b*.

Thus, as shown in FIG. 1B and FIG. 1C, the outer notch 36 (37) is disposed to face the gap G1 (G2), and the inner notch 38 is disposed to face the gap G3. After that, the coil device 10 shown in FIG. 1A is obtained by joining the first core 20*a* and the second core 20*b* with adhesive agent or so.

In the coil device 10 according to the present embodiment, the notches 36-38 are formed on the conductor 30 at a position corresponding to the gaps G1-G3. Thus, at the position corresponding to the gaps G1-G3, the surface of the conductor 30 is disposed at a position separated from the gaps G1-G3 by a distance corresponding to the depth of the notches 36-38, and the leakage magnetic flux generated in the gaps G1-G3 is less likely to hit the surface of the conductor 30. Thus, the eddy current is less likely to be generated in the surface of the conductor 30, and the generation of AC loss due to the eddy current can be prevented.

Figure 4A:
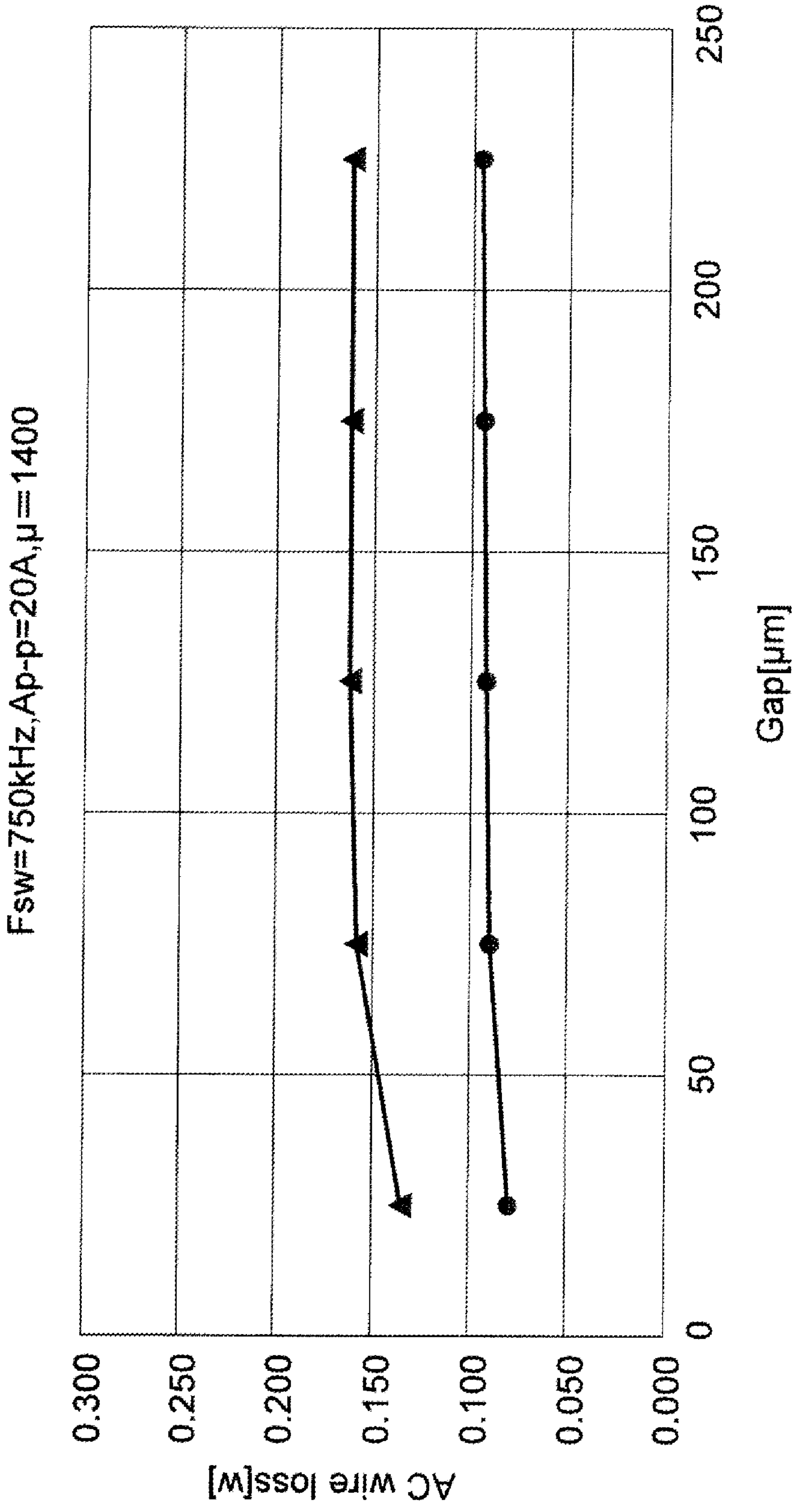
FIG. 4A is a figure illustrating a change in wire loss (copper loss) at the time of changing the width of a gap.

FIG. 4A is a figure illustrating a change in wire loss (copper loss) at the time of changing the width of the gaps G1-G3 when the frequency of an alternating current flowing through the conductor 30 is 750 kHz, the current value (peak to peak value) of the alternating current is 20 A, and the relative permeability of the material constituting the cores 20*a* and 20*b* is 1400. In the figure, the circle marks indicate a wire loss when the conductor 30 includes the notches 36-38, and the triangular marks indicate a wire loss when the conductor 30 does not include the notches 36-38. As shown in the figure, it can be seen that any value of the wire loss with the conductor 30 including the notches 36-38 is smaller than that of the wire loss with the conductor 30 not including the notches 36-38 at the time of changing the width of the gaps G1-G3 within the range of 0<Gap<250.

Figure 4B:
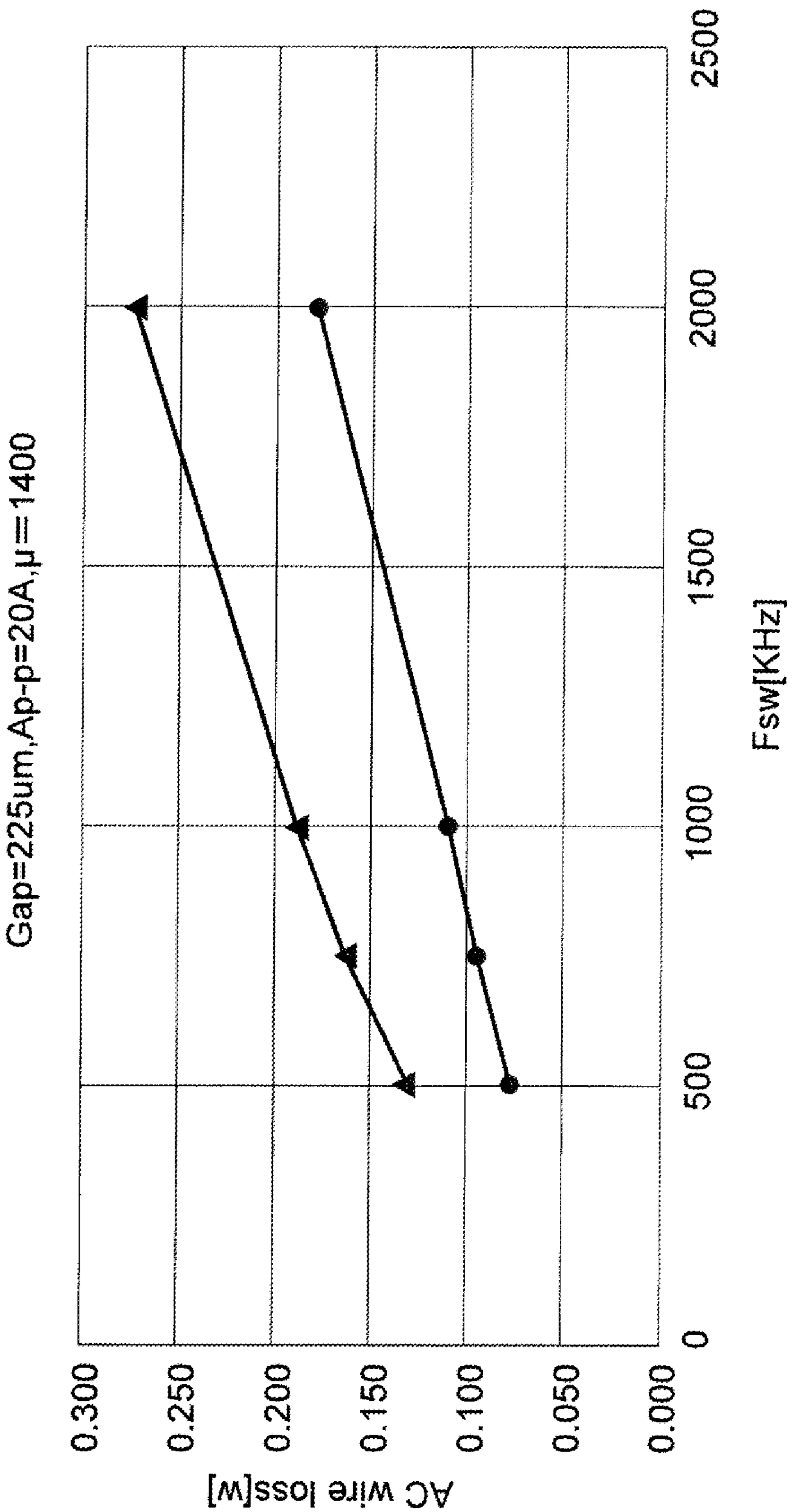
FIG. 4B is a figure illustrating a change in wire loss (copper loss) at the time of changing the frequency of an alternating current flowing through a conductor.

FIG. 4B is a figure illustrating a change in wire loss at the time of changing the frequency of an alternating current flowing through the conductor 30 when the width of the gaps G1-G3 is 225 the current value (peak to peak value) of the alternating current flowing through the conductor 30 is 20 A, and the relative permeability of the material constituting the cores 20*a* and 20*b* is 1400. As shown in this figure, it can be seen that any value of the wire loss with the conductor 30 including the notches 36-38 is smaller than that of the wire loss with the conductor 30 not including the notches 36-38 at the time of changing the frequency within the range of 500≤Fsw≤2000.

Figure 4C:
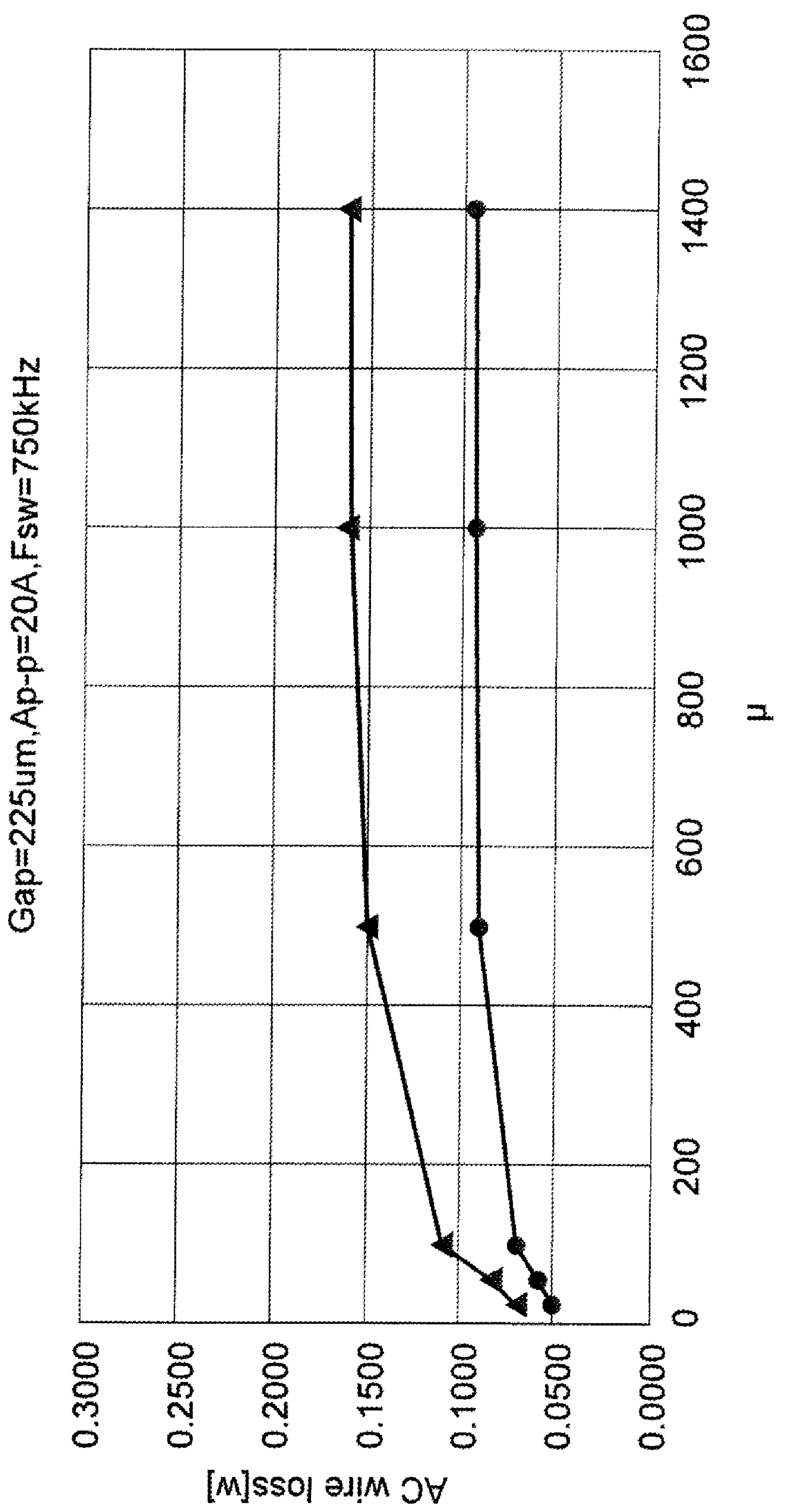
FIG. 4C is a figure illustrating a change in wire loss (copper loss) at the time of changing the relative permeability of a material constituting a core.

FIG. 4C is a figure illustrating a change in wire loss at the time of changing the relative permeability of the material constituting the cores 20*a* and 20*b* when the width of the gaps G1-G3 is 225 the current value (peak to peak value) of an alternating current flowing through the conductor 30 is 20 A, and the frequency of the alternating current is 750 kHz. As shown in this figure, it can be seen that any value of the wire loss with the conductor 30 including the notches 36-38 is smaller than that of the wire loss with the conductor 30 not including the notches 36-38 at the time of changing the relative permeability within the range of 0<μ≤1400. Preferably, the material constituting the cores 20*a* and 20*b* is ferrite.

Figure 4D:
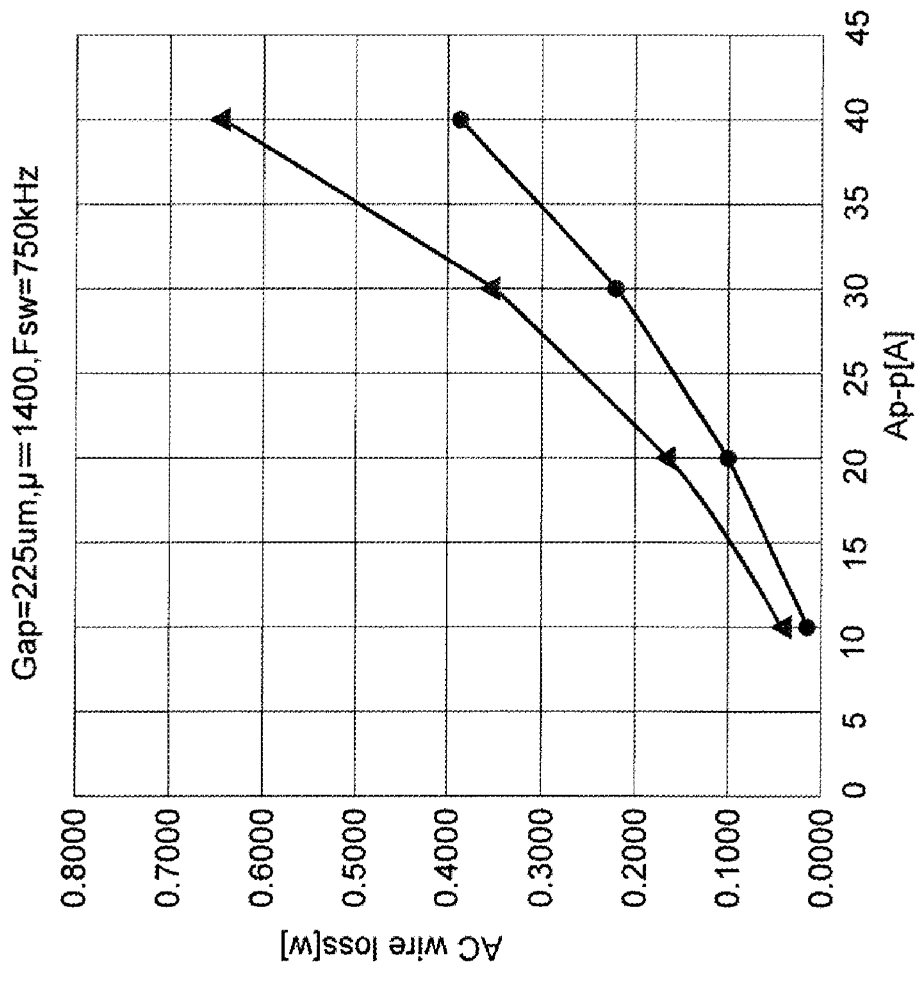
FIG. 4D is a figure illustrating a change in wire loss (copper loss) at the time of changing the current value (peak to peak value) of an alternating current flowing through a conductor.

FIG. 4D is a figure illustrating a change in wire loss at the time of changing a current value (peak to peak value) of an alternating current flowing through the conductor 30 when the width of the gaps G1-G3 is 225 μm, the relative permeability of the material constituting the cores 20*a* and 20*b* is 1400, and the frequency of the alternating current is 750 kHz. As shown in this figure, it can be seen that, any value of the wire loss with the conductor 30 including the notches 36-38 is smaller than that of the wire loss with the conductor 30 not including the notches 36-38 at the time of changing the current value (peak to peak value) of the alternating current within the range of 10≤Ap−p≤40.

Figure 4E:
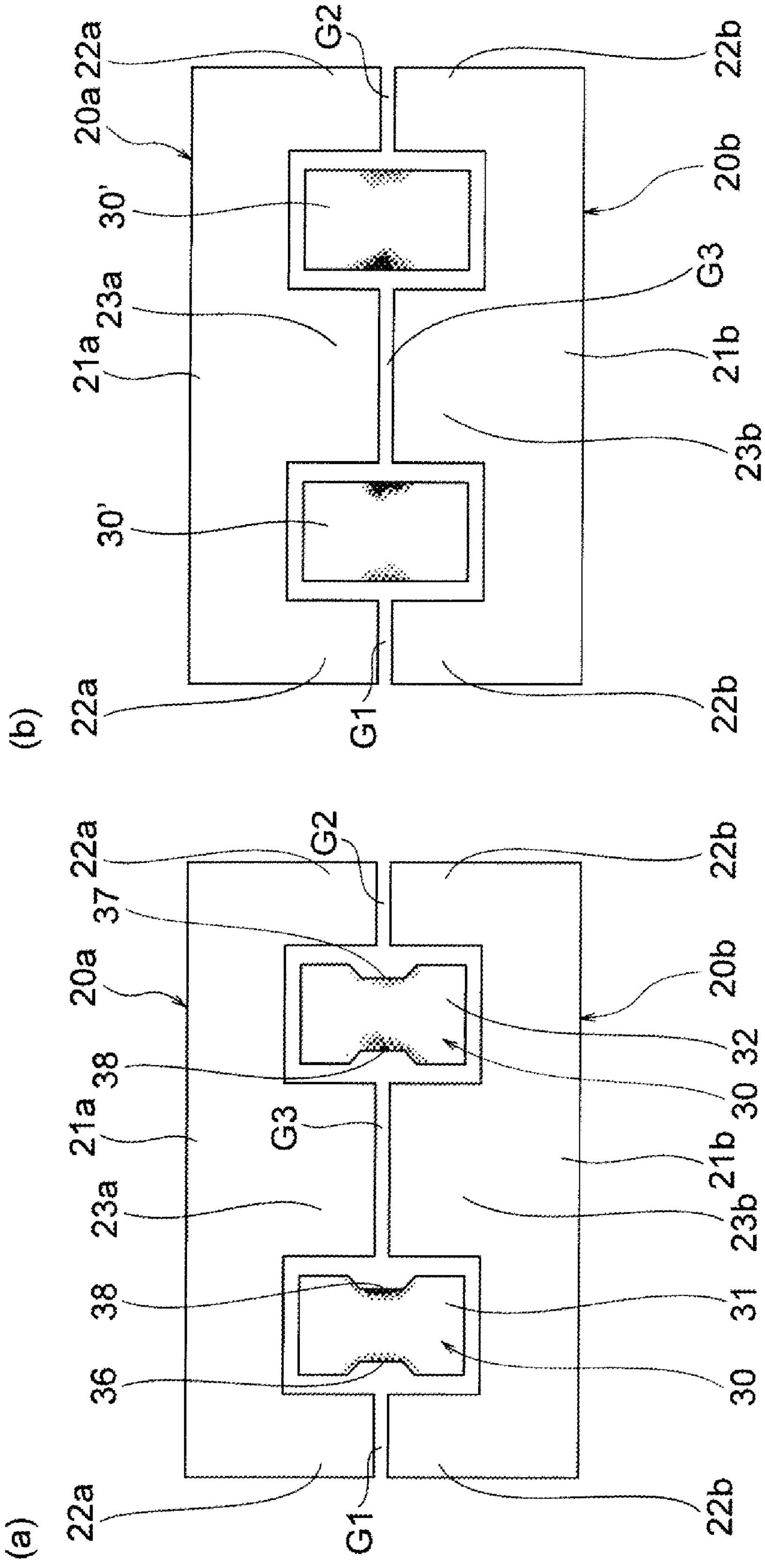
FIG. 4E is a figure illustrating a distribution of wire loss (copper loss) in a conductor.

FIG. 4E is a figure illustrating a distribution of wire loss in the conductor 30. FIG. 4E(a) illustrates a distribution of wire loss in the conductor 30 including the notches 36-38, and FIG. 4E(b) illustrates a distribution of wire loss in a conductor 30' not including the notches 36-38. The magnitude of wire loss is represented by the number of dots shown in the figure. The larger the number of dots is, the larger the wire loss is. As is clear from the comparison of FIG. 4E(a) and FIG. 4E(b), at the position corresponding to the gaps G1-G3, the wire loss of the conductor 30 including the notches 36-38 is smaller than that of conductor 30' not including the notches 36-38.

In the coil device 10 according to the present embodiment, since the notches 36-38 are formed on the conductor 30 at the position corresponding to the gaps G1-G3, unlike the prior arts, the shape of the first core 20*a* or the second core 20*b* may not be changed so as to prevent the leakage magnetic flux generated in the gaps G1-G3 from hitting the surface of the conductor 30. Thus, the volume of the first core 20*a* or the second core 20*b* can be secured sufficiently, and the coil device 10 can have favorable inductance characteristics.

Figure 4F:
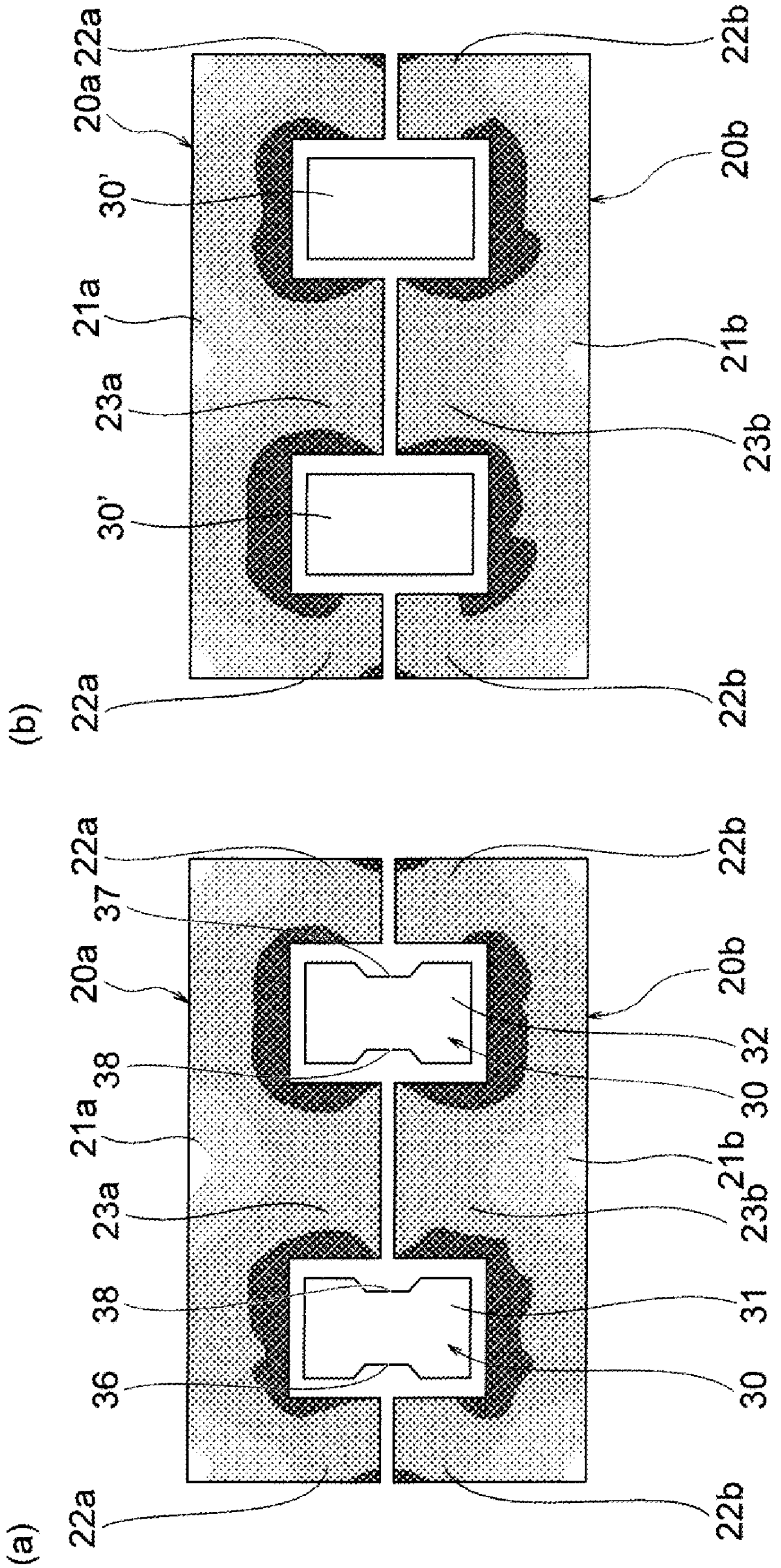
FIG. 4F is a figure illustrating a magnetic flux distribution in a core.

FIG. 4F is a figure illustrating a distribution of magnetic flux in the cores 20*a* and 20*b*. FIG. 4F(a) illustrates a distribution of magnetic flux in the cores 20*a* and 20*b* around the conductor 30 including the notches 36-38, and FIG. 4F(b) illustrates a distribution of magnetic flux in the cores 20*a* and 20*b* around the conductor 30' not including the notches 36-38. The magnitude of magnetic flux is represented by color shade. The darker the color is, the larger the magnetic flux is. As is clear from the comparison of FIG. 4F(a) and FIG. 4F(b), the distributions of magnetic flux in the cores 20*a* and 20*b* are similar to each other. This indicates that even if the conductor 30 includes the notches 36-38, the magnetic flux in the cores 20*a* and 20*b* does not decrease excessively, and favorable inductance characteristics can be obtained.

In the present embodiment, the outer notches 36 and 37 (inner notch 38) are formed on the conductor 30 along the outer leg edges 22*a*1 and 22*b*1 of the outer legs 22*a* and 22*b* (the middle leg edges 23*a*1 and 23*b*1 of the outer legs 23*a* and 23*b*) next to the conductor 30. Thus, at each part of the gaps G1 and G2 (gap G3) extending along the outer leg edges 22*a*1 and 22*b*1 of the outer legs 22*a* and 22*b* (the middle leg edges 23*a*1 and 23*b*1 of the outer legs 23*a* and 23*b*), the leakage magnetic flux generated in the gaps G1 and G2 (gap G3) is less likely to hit the surface of the conductor 30, and the generation of eddy current can effectively be prevented in the surface of the conductor 30. In addition, the above-mentioned effects can be obtained in the coil device 10 including what is called an EE type core.

In the present embodiment, the depth of the notches 36-38 is larger than the width of the gaps G1-G3. Thus, at the position corresponding to the gaps G1-G3, the surface of the conductor 30 can be disposed sufficiently separately from the gaps G1-G3. Thus, the leakage magnetic flux generated in the gaps G1-G3 is less likely to hit the surface of the conductor 30, and the generation of eddy current can effectively be prevented in the surface of the conductor 30.

In the present embodiment, the notches 36-38 are made of a concave groove. Thus, when the gaps G1-G3 are formed between the first outer leg 22*a* and the second outer leg 22*b* or between the first middle leg 23*a* and the second middle leg 23*b*, the notches 36-38 can be arranged at a position opposite to the gaps G1-G3. Thus, the leakage magnetic flux generated in the gaps G1-G3 is less likely to hit the surface of the conductor 30, and the generation of eddy current can effectively be prevented in the surface of the conductor 30.

In the present embodiment, the conductor 30 has a curved shape, and the notches 36-38 are formed on the inner circumferential side and the outer circumferential side of the conductor 30. Since the outer notches 36 and 37 are formed on the outer circumferential side of the conductor 30, the leakage magnetic flux generated in the gaps G1 and G2 formed between the first outer leg 22*a* and the second outer leg 22*b* is less likely to hit the outer circumferential side of the conductor 30, and the generation of eddy current can effectively be prevented in the surface of the conductor 30. Since the inner notch 38 is formed on the inner circumferential side of the conductor 30, the leakage magnetic flux generated in the gap G3 formed between the first middle leg 23*a* and the second middle leg 23*b* is less likely to hit the inner circumferential side of the conductor 30, and the generation of eddy current can effectively be prevented in the surface of the conductor 30.

In the present embodiment, the conductor 30 includes the mounting parts 34 and 35 for connecting to an external circuit, and the outer notch 36 (37) is partly formed in the mounting part 34 (35). Thus, the leakage magnetic flux generated in the gaps G1 and G2 is less likely to hit the surfaces of the mounting parts 34 and 35, and the generation of eddy current can effectively be prevented in the surface of the conductor 30.

Second Embodiment

A coil device 110 according to Second Embodiment of the present invention is different from the coil device 10 according to First Embodiment only in the following matters and has structure and effect similar to those of the coil device 10 according to First Embodiment. In the figures, common members with First Embodiment are given common references and are not explained.

Figure 5A:
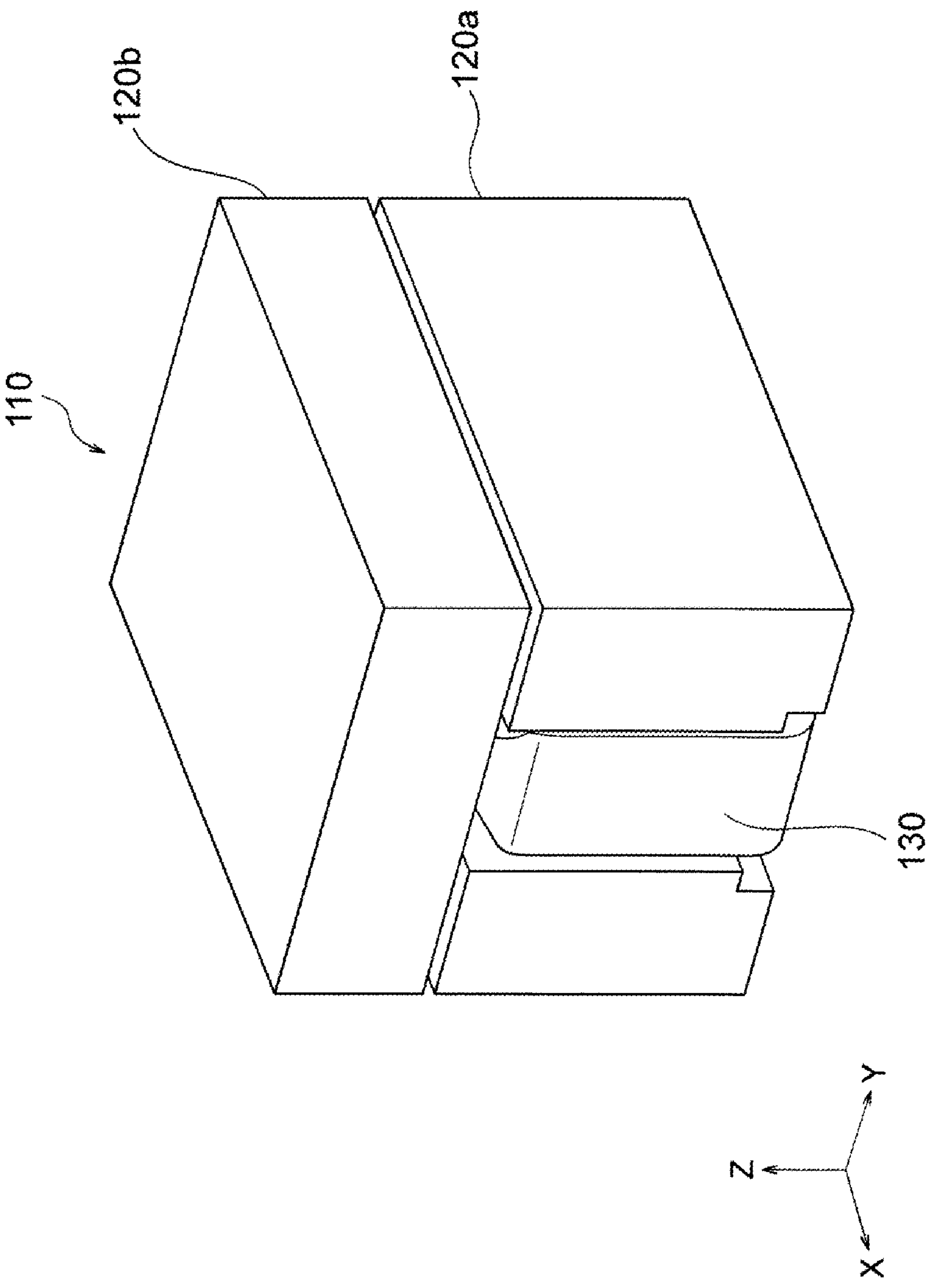
FIG. 5A is a perspective view of a coil device according to Second Embodiment of the present invention.
Figure 6:
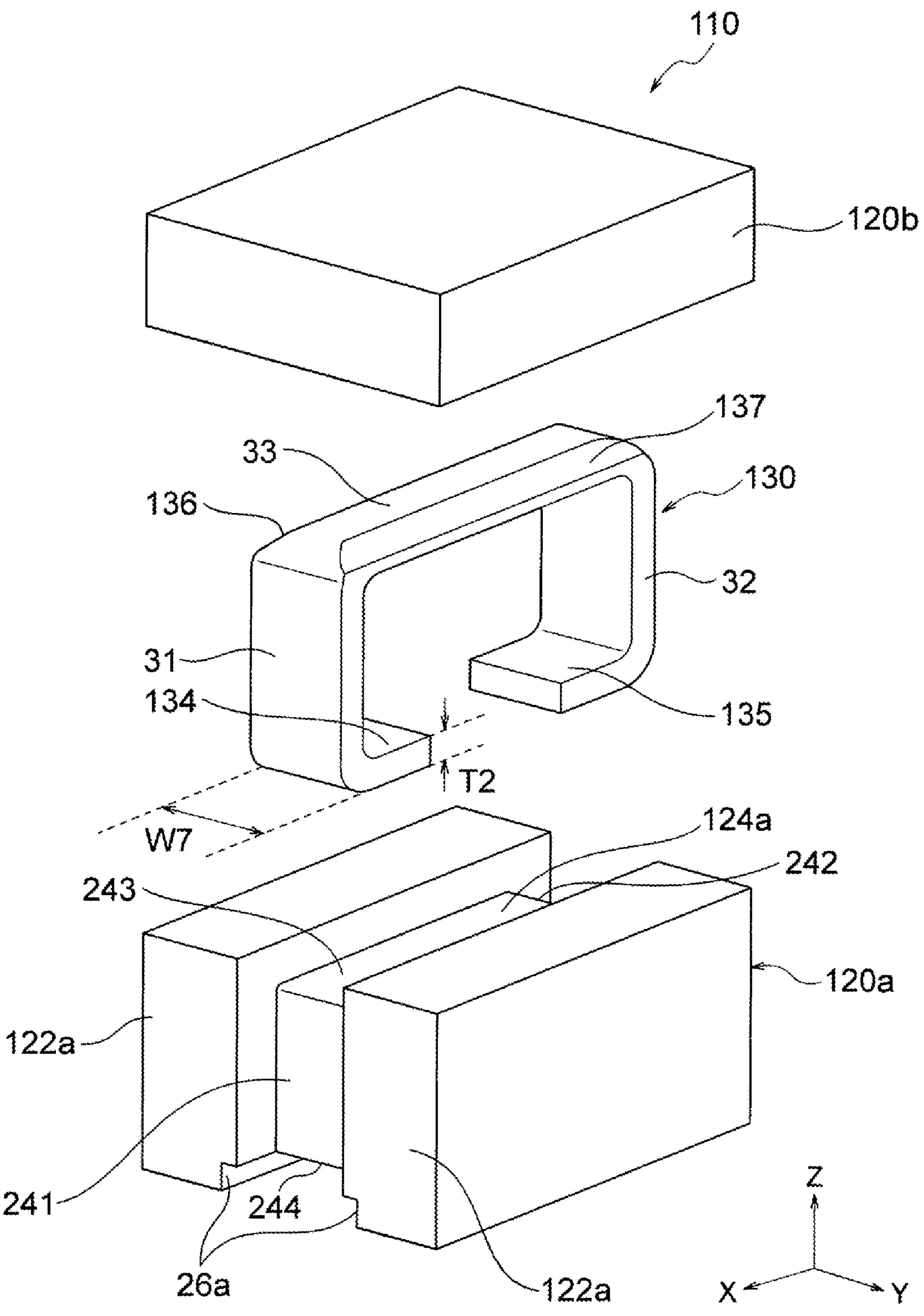
FIG. 6 is an exploded perspective view of the coil device shown in FIG. 5A.

As shown in FIG. 5A, the coil device 110 includes a first core 120*a*, a second core 120*b*, and a conductor 130. In the coil device 110, the conductor 130 is vertically sandwiched by the first core 120*a* and the second core 120*b*. As shown in FIG. 6, the first core 120*a* includes a pair of first outer legs 122*a* and 122*a* and a first groove 124*a*.

The pair of first outer legs 122*a* and 122*a* each has an approximately rectangular parallelepiped shape and is disposed with a predetermined interval in the Y-axis direction. The width of the first outer leg 122*a* (122*a*) in the X-axis direction is larger than that of the first outer leg 122*a* (122*a*) in the Y-axis direction. The first outer leg 122*a* (122*a*) is formed so as to be longer in the X-axis direction.

The first outer leg 122*a* (122*a*) includes a first step 26*a* (26*a*). For more detail, the first step 26*a* (26*a*) is formed at the lower end of the first outer leg 122*a* (122*a*) and is located on the inner side of the first outer leg 122*a* (122*a*) in the Y-axis direction. The first outer legs 122*a* and 122*a* are opposite to each other in the Y-axis direction and continuously extend in the X-axis direction.

The first groove 124*a* is formed between the pair of first outer legs 122*a* and 122*a*. The conductor 130 can be disposed in the first groove 124*a*. The first groove 124*a* extends so as to enclose the first core 120*a* in the X-axis direction and the Z-axis direction at an approximately central part of the first core 120*a* in the Y-axis direction. The depth of the first groove 124*a* is as large as or larger than the thickness of the conductor 130.

In addition to the first side part 241, the second side part 242, and the upper part 243, the first groove 124*a* includes a lower part 244. The upper part 243 and the lower part 244 are formed opposite to each other in the Z-axis direction and extend in the X-axis direction. As mentioned below, the conductor upper part 33 of the conductor 130 is disposed in the upper part 243, and mounting parts 134 and 135 of the conductor 130 are arranged at the ends of the lower part 244 in the Y-axis direction.

The first side part 241 and the second side part 242 are formed opposite to each other in the X-axis direction and extend in the Z-axis direction. As mentioned below, the first conductor side part 31 of the conductor 130 is disposed in the first side part 241, and the second conductor side part 32 of the conductor 130 is disposed in the second side part 242.

Figure 5B:
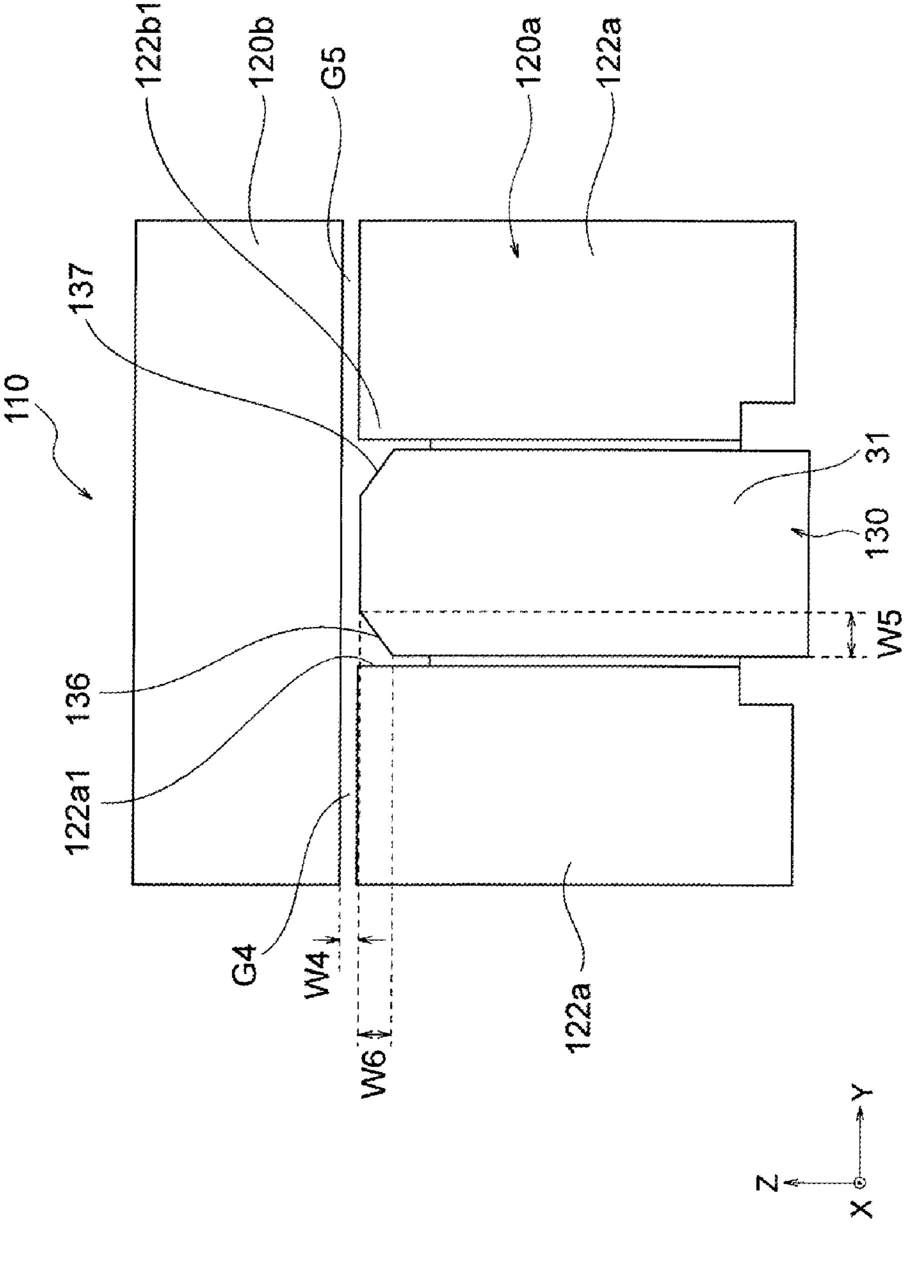
FIG. 5B is a side view of the coil device shown in FIG. 5A.

The second core 120*b* has a flat plate shape. As shown in FIG. 5B, a gap G4 is formed between the first outer leg 122*a* located on one side in the Y-axis direction and the second core 120*b*, and a gap G5 is formed between the first outer leg 122*a* located on the other side in the Y-axis direction and the second core 120*b*. The gap G4 (G5) extends in the X-axis direction and the Y-axis direction along the upper end of the first outer leg 122*a* (122*a*).

As shown in FIG. 6, in addition to the first conductor side part 31, the second conductor side part 32, and the conductor upper part 33, the conductor 130 includes the first mounting part 134 and the second mounting part 135. The first mounting part 134 and the second mounting part 135 are formed at one end and the other end of the conductor 130. That is, the first mounting part 134 and the second mounting part 135 are formed continuously (integrally) to the lower ends of the first conductor side part 31 and the second conductor side part 32. The first mounting part 134 and the second mounting part 135 are bent approximately perpendicularly to the conductor side parts 31 and 32 and extend inward in the X-axis direction.

A first outer notch 136 and a second outer notch 137 are formed on the outer circumferential side (surface) of the conductor 130. The outer notches 136 and 137 are formed on the surface of the conductor upper part 33 and continuously extend in the X-axis direction along the extending direction (longitudinal direction) of the conductor upper part 33.

The first outer notch 136 is made of a chamfered portion obtained by chamfering one side (upper corner) of the conductor upper part 33 in the Y-axis direction. The second outer notch 137 is made of a chamfered portion obtained by chamfering the other side (upper corner) of the conductor upper part 33 in the Y-axis direction. At the positions of the outer notches 136 and 137, each side (upper corner) of the conductor upper part 33 is an inclined surface (C surface), and the width of the conductor upper part 33 in the Y-axis direction becomes smaller upward.

As shown in FIG. 5B, the outer notches 136 and 137 are formed on the conductor 130 at positions corresponding to the gaps G4 and G5 (positions close to the gaps G4 and G5). For more detail, the outer notches 136 and 137 are formed in the conductor 130 so as to extend in the X-axis direction along outer edges 122*a*1 and 122*b*1 of the outer legs 122*a* and 122*b* next to the conductor 130.

The first outer notch 136 diagonally faces the other end of the gap G4 in the Y-axis direction. At the position corresponding to the gap G4, the surface of the conductor 130 and the other end of the gap G4 in the Y-axis direction are away from each other by a distance corresponding to a width W5 of the first outer notch 136 in the Y-axis direction or a width W6 of the first outer notch 136 in the Z-axis direction. The second outer notch 137 diagonally faces one end of the gap G5 in the Y-axis direction. At the position corresponding to the gap G5, the surface of the conductor 130 and one end of the gap G5 in the Y-axis direction are away from each other by a distance corresponding to a width of the second outer notch 137 in the Y-axis direction or a width of the second outer notch 137 in the Z-axis direction.

Preferably, the width of the outer notch 136 (137) in the Y-axis direction is larger than that of the gap G4 (G5) in the Z-axis direction, but may not be larger than that of the gap G4 (G5) in the Z-axis direction. The ratio W5/W4 of the width W5 of the first outer notch 136 in the Y-axis direction to the width W4 of the gap G4 in the Z-axis direction is preferably 0.5-6, more preferably 1-5, still more preferably 2-4. This is also the case with the ratio of the width of the second outer notch 137 in the Y-axis direction to the width of the gap G5 in the Z-axis direction.

Preferably, the width of the outer notch 136 (137) in the Z-axis direction is larger than that of the gap G4 (G5) in the Z-axis direction, but may not be larger than that of the gap G4 (G5) in the Z-axis direction. The ratio W6/W4 of the width W6 of the first outer notch 136 in the Z-axis direction to the width W4 of the gap G4 in the Z-axis direction is preferably 0.5-6, more preferably 1-5, still more preferably 2-4. This is also the case with the ratio of the width of the second outer notch 137 in the Z-axis direction to the width of the gap G5 in the Z-axis direction.

The ratio W5/W7 of the width W5 of the first outer notch 136 in the Y-axis direction to the width W7 of the conductor 130 in the Y-axis direction (FIG. 6) is preferably 0.1-0.5, more preferably 0.2-0.3. This is also the case with the ratio of the width of the second outer notch 137 in the Y-axis direction to the width W7 of the conductor 130 in the Y-axis direction.

The ratio W6/T2 of the width W6 of the first outer notch 136 in the Z-axis direction to the thickness T2 of the conductor 130 (FIG. 6) is preferably 0.1-0.9, more preferably 0.3-0.7. This is also the case with the ratio of the width of the second outer notch 137 in the Z-axis direction to the thickness T2 of the conductor 130.

In the present embodiment, at the positions corresponding to the gaps G4 and G5, the leakage magnetic flux generated in the gaps G4 and G5 can be prevented from hitting the conductor upper part 33 by determining each value of W5/W4, W6/W4, W5/W7 and W6/T2 as mentioned above or satisfying W5>W4 or W6/W4.

In the present embodiment, the second core 120*b* has a flat plate shape, and the first outer notch 136 (137) is formed on the conductor 130 at a position corresponding to the gap G4 (G5) formed between the first leg 122*a* (122*a*) and the second core 120*b*. Thus, various effects similar to those of First Embodiment can be obtained in the coil device 110 including what is called an EI type core.

In the present embodiment, the first outer notch 136 (137) is made of a chamfered portion obtained by chamfering the side of the conductor 130. Thus, the first outer notch 136 (137) can be disposed at a position corresponding to the gap G4 (G5) formed between the first leg 122*a* (122*a*) and the second core 120*b* having a flat plate shape. Thus, the leakage magnetic flux generated in the gap G4 (G5) is less likely to hit the surface of the conductor 130 (particularly, the conductor upper part 33), and the generation of eddy current can effectively be prevented in the surface of the conductor 130.

Third Embodiment

A coil device 210 according to Third Embodiment of the present invention is different from the coil device 110 according to Second Embodiment only in the following matters and has structure and effect similar to those of the coil device 110 according to Second Embodiment. In the figures, common members with Second Embodiment are given common references and are not explained.

Figure 7A:
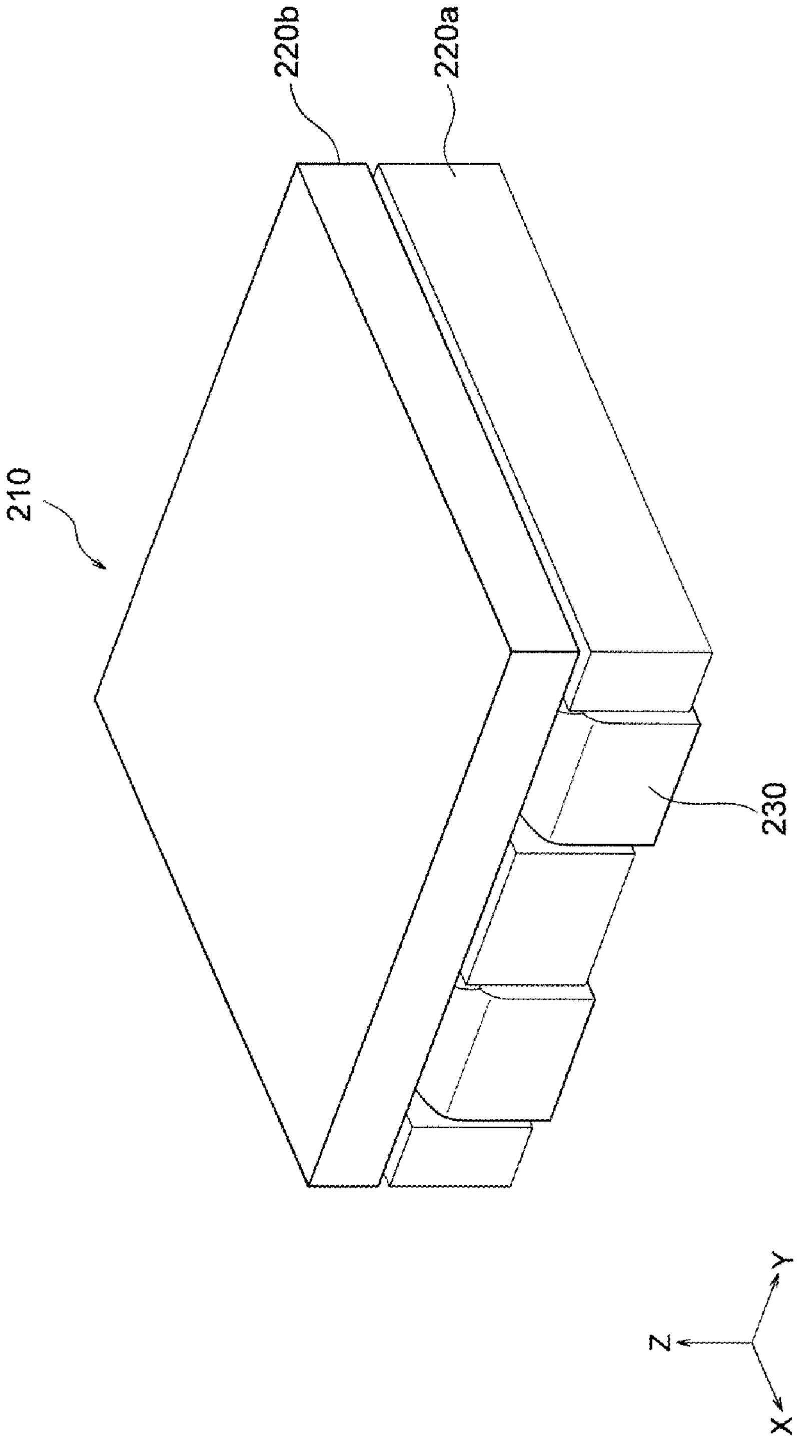
FIG. 7A is a perspective view of a coil device according to Third Embodiment of the present invention.

As shown in FIG. 7A, the coil device 210 includes a first core 220*a*, a second core 220*b*, and a conductor 230. As is clear from comparison between FIG. 8 and FIG. 6, the second core 220*b* is different from the second core 120*b* according to Second Embodiment in that the second core 220*b* is thin in the Z-axis direction.

Figure 8:
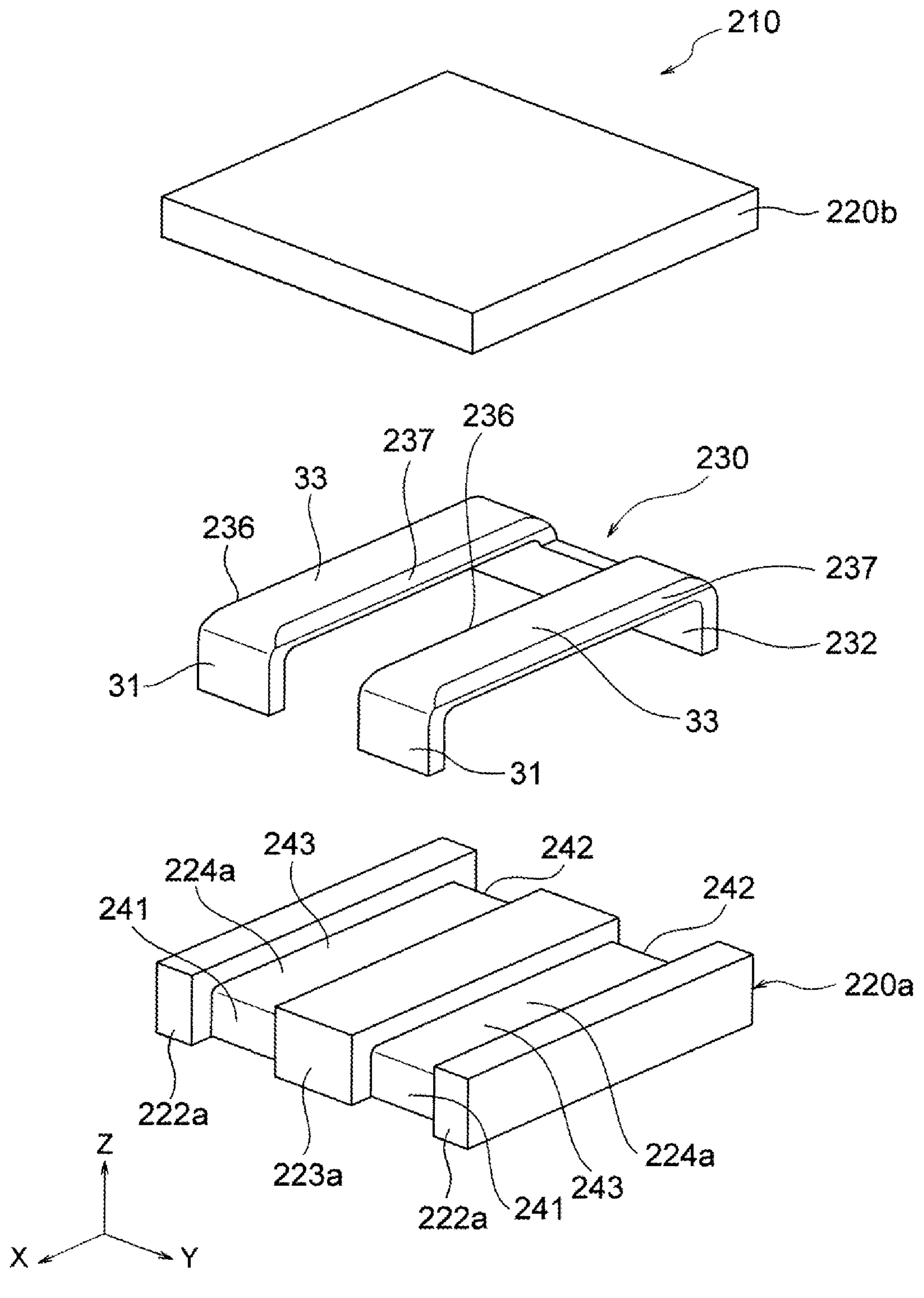
FIG. 8 is an exploded perspective view of the coil device shown in FIG. 7A.

As shown in FIG. 8, the first core 220*a* includes a pair of first outer legs 222*a* and 222*a*, a first middle leg 223*a*, and a pair of first grooves 224*a* and 224*a*. Unlike the first outer legs 122*a* and 122*a* according to Second Embodiment, the pair of first outer legs 222*a* and 222*a* does not include the first step 26*a* (26*a*) (FIG. 6).

The first middle leg 223*a* is located between the pair of first outer legs 222*a* and 222*a*. The shape of the first middle leg 223*a* is similar to that of the first outer leg 222*a* (222*a*). Incidentally, the width of the first middle leg 223*a* in the Y-axis direction is larger than that of the first outer leg 222*a* (222*a*) in the Y-axis direction.

The first groove 224*a* located on one side in the Y-axis direction is formed between the first outer leg 222*a* located on one side in the Y-axis direction and the first middle leg 223*a*. The first groove 224*a* located on the other side in the Y-axis direction is formed between the first outer leg 222*a* located on the other side in the Y-axis direction and the first middle leg 223*a*.

The pair of first grooves 224*a* and 224*a* is different from the first grooves 124*a* according to Second Embodiment in that the pair of first grooves 224*a* and 224*a* does not include the lower part 244 shown in FIG. 6. The conductor upper parts 33 and 33 of the conductor 230 can be arranged in the first grooves 224*a* and 224*a*.

The conductor 230 includes the pair of conductor upper parts 33 and 33, the pair of first conductor side parts 31 and 31 each connected to one end of the pair of conductor upper parts 33 and 33 in the X-axis direction, and a second conductor side part 232 connected to the other end of the pair of conductor upper parts 33 and 33 in the X-axis direction and connecting the pair of conductor upper parts 33 and 33.

Figure 9:
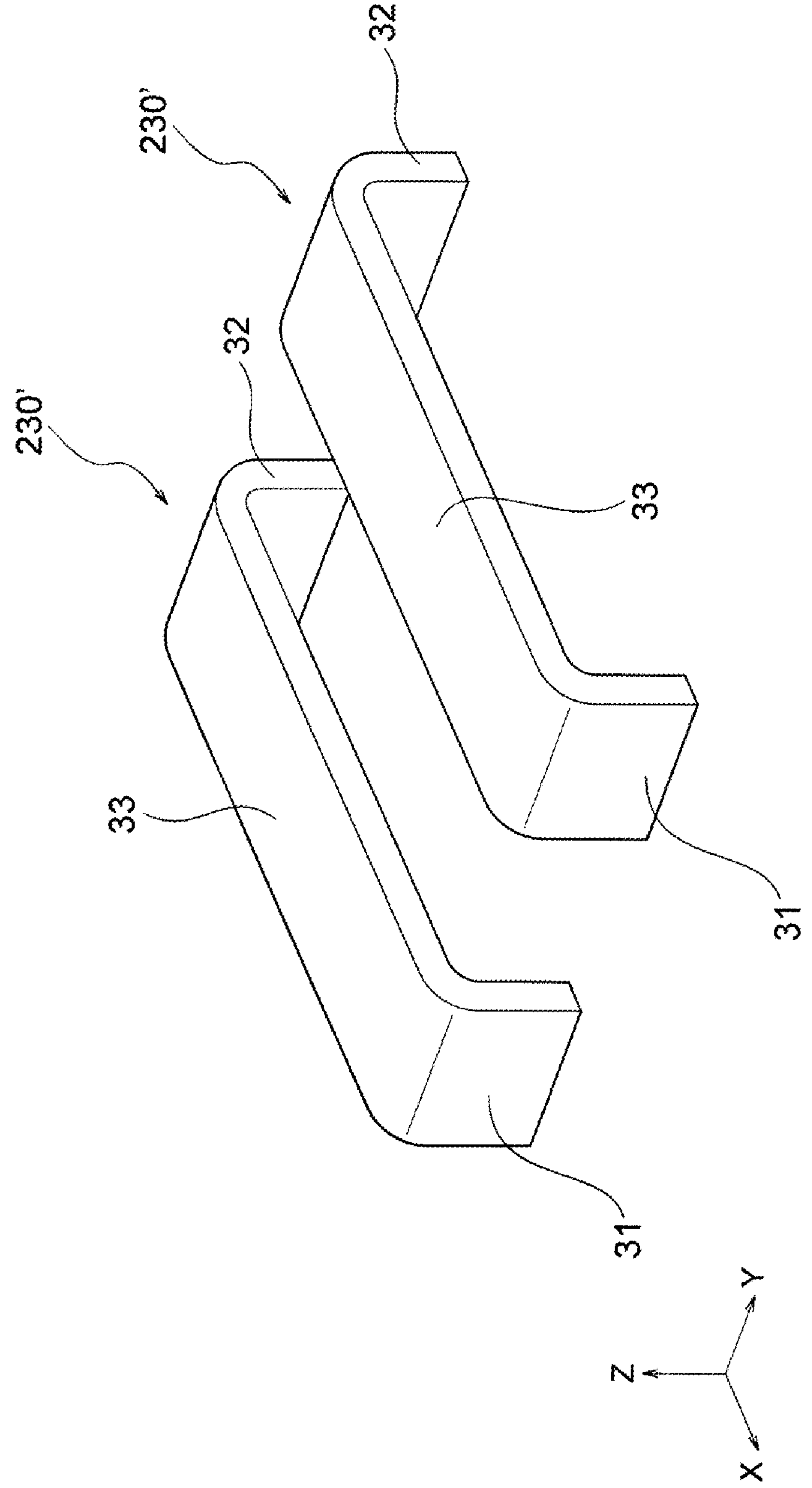
FIG. 9 is a perspective view illustrating a modified example of a coil shown in FIG. 8.

The pair of conductor upper parts 33 and 33 is disposed with a predetermined interval in the Y-axis direction. The second conductor side part 232 extends in the Y-axis direction and can connect the pair of conductor upper parts 33 and 33 via the second conductor side part 232. Incidentally, as shown in FIG. 9, the conductor upper parts 33 and 33 may not be connected via the second conductor side part 232, but the coil device 210 may include two conductors 230' and 230' formed from the conductor upper parts 33 and 33 with the second conductor side parts 32 and 32.

Figure 7B:
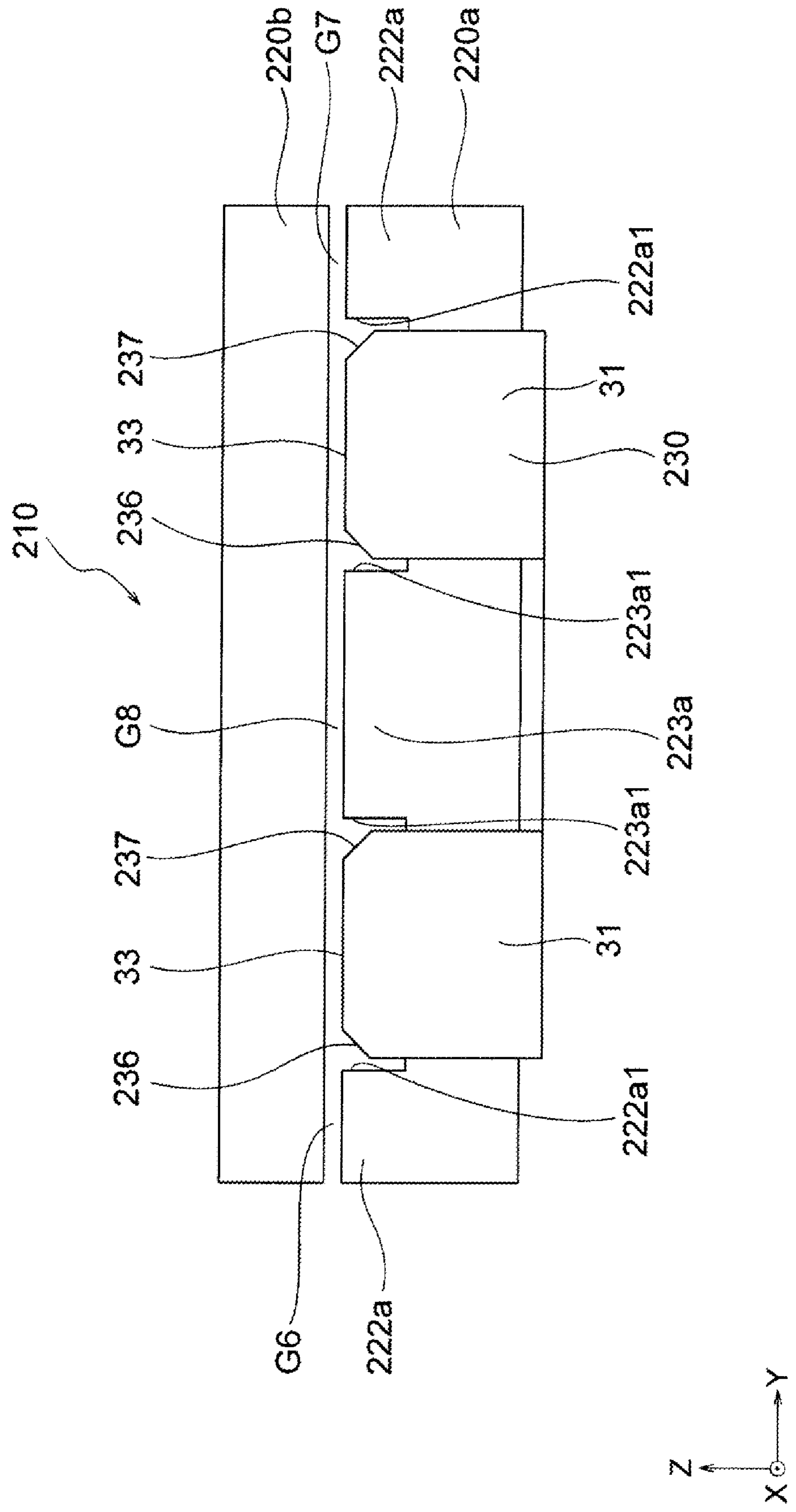
FIG. 7B is a side view of the coil device shown in FIG. 7A.

As shown in FIG. 7B, a gap G6 is formed between the first outer leg 222*a* located on one side in the Y-axis direction and the second core 220*b*, and a gap G7 is formed between the first outer leg 222*a* located on the other side in the Y-axis direction and the second core 220*b*. The gaps G6 and G7 extend in the X-axis direction and the Y-axis direction along the upper ends of the first outer legs 222*a*.

A gap G8 is formed between the first middle leg 223*a* and the second core 220*b*. The gap G8 extends in the X-axis direction and the Y-axis direction along the upper end of the first middle leg 223*a*.

A first outer notch 236 and a second outer notch 237 are formed on the outer circumferential side (surface) of the conductor upper part 33 (33). The first outer notch 236 and the second outer notch 237 extend continuously in the extending direction (longitudinal direction) of the conductor upper part 33 (33). The shape of the outer notch 236 (237) is similar to that of the outer notch 136 (137) according to Second Embodiment.

In the conductor upper part 33 located on one side in the Y-axis direction, the outer notch 236 (237) is formed on the conductor 230 at a position corresponding to the gap G6 (G8) (a position close to the gap G6 (G8)). For more detail, the first outer notch 236 diagonally faces the other end of the gap G6 in the Y-axis direction and is formed on the conductor 230 so as to extend in the X-axis direction along a first outer leg edge 222*a*1 of the first outer leg 222*a* next to the conductor 230, and the second outer notch 237 diagonally faces one end of the gap G8 in the Y-axis direction and is formed on the conductor 230 so as to extend in the X-axis direction along a first middle leg edge 223*a*1 of the first middle leg 223*a* next to the conductor 230.

In the conductor upper part 33 located on the other side in the Y-axis direction, the outer notch 236 (237) is formed on the conductor 230 at a position corresponding to the gap G8 (G7) (a position close to the gap G8 (G7)). For more detail, the first outer notch 236 diagonally faces the other end of the gap G8 in the Y-axis direction and is formed on the conductor 230 so as to extend in the X-axis direction along a first middle leg edge 223*a*1 of the first middle leg 223*a* next to the conductor 230, and the second outer notch 237 diagonally faces one end of the gap G7 in the Y-axis direction and is formed on the conductor 230 so as to extend in the X-axis direction along a first outer leg edge 222*a*1 of the first outer leg 222*a* next to the conductor 230.

In the present embodiment, effects similar to those of First Embodiment can be obtained in the coil device 210 including what is called an EI type core.

Fourth Embodiment

A coil device 310 according to Fourth Embodiment of the present invention is different from the coil device 10 according to First Embodiment only in the following matters and has structure and effect similar to those of the coil device 10 according to First Embodiment. In the figures, common members with First Embodiment are given common references and are not explained.

As shown in FIG. 0.10, the coil device 310 according to the present embodiment includes a conductor 330 and a conductor 40. Either one of the conductors 330 and 40 functions as a primary coil, and the other one of the conductors 330 and 40 functions as a secondary coil. That is, the coil device 310 according to the present embodiment functions as a combined coil of the two conductors 330 and 40.

The conductor 40 has a substantially U shape and includes a first conductor side part 41, a second conductor side part 42, a conductor upper part 43, a first mounting part 44, and a second mounting part 45. The first conductor side part 41 and the second conductor side part 42 are arranged opposite to each other in the X-axis direction, and the conductor upper part 43 connects the upper ends of the conductor side parts 41 and 42. The mounting part 44 (45) is connected continuously (integrally) to the lower end of the conductor side part 41 (42). The mounting part 44 (45) is bent substantially perpendicularly to the conductor side part 41 (42) and extends inward in the X-axis direction. In the illustrated example, the conductor 40 is thinner than the conductor 330.

An insulating layer made of an insulating film or so may be formed on the surface of the conductor 40. Preferably, among the surfaces of the conductor 40, the insulating layer is formed on the outer surface (outer circumferential surface) of the conductor 40. Among the surfaces of the conductor 40, the insulating layer may cover the entire surface excluding the bottom surfaces of the first mounting part 44 and the second mounting part 45. The insulating layer exists between the conductor 330 and the conductor 40 and favorably insulates the conductor 330 and the conductor 40. The insulating layer is made of any material, such as polyester, polyesterimide, polyamide, polyamideimide, polyurethane, epoxy, and epoxy-modified acrylic resin.

Figure 11:
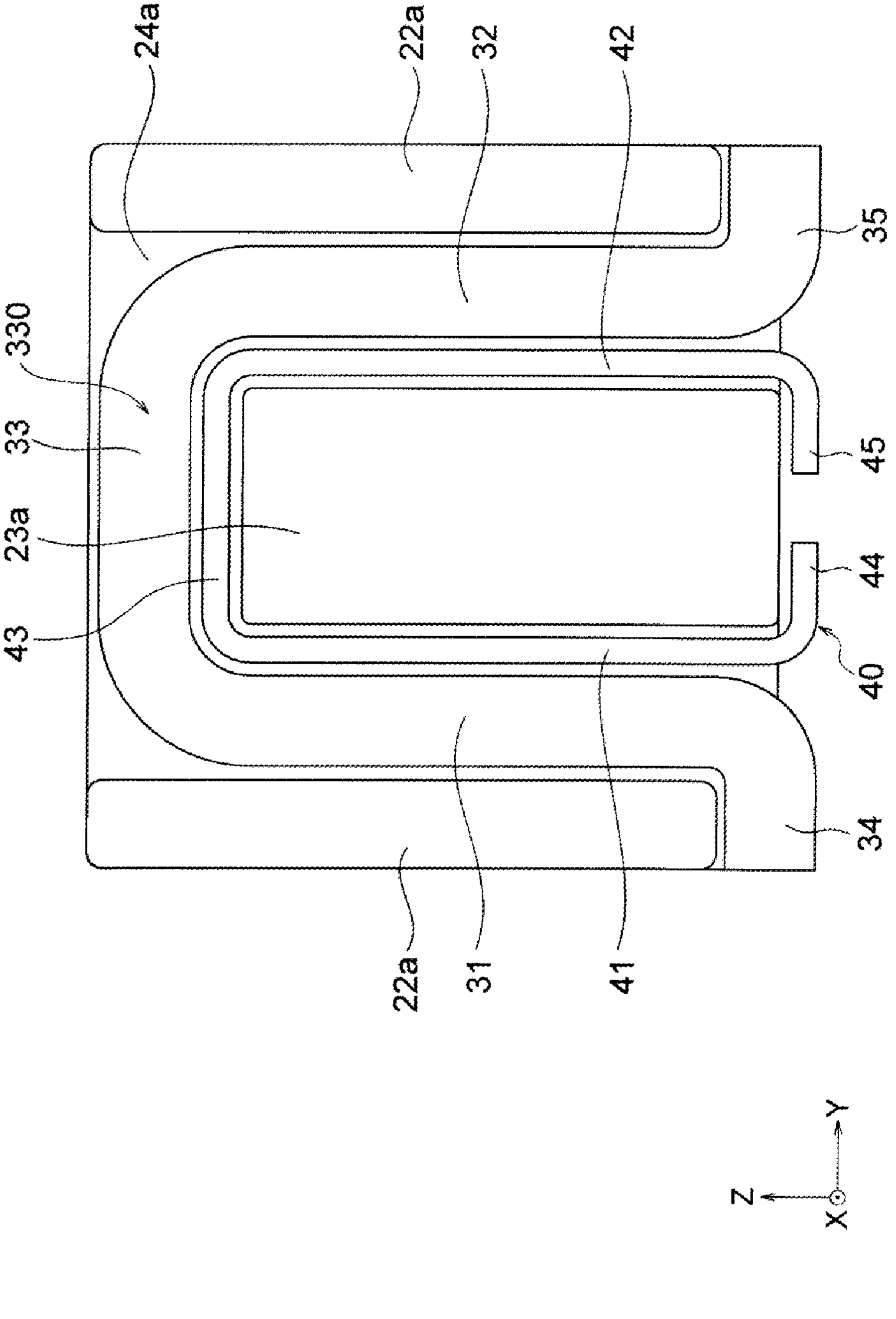
FIG. 11 is a side view at the time of removing one core from the coil device shown in FIG. 10.

As shown in FIG. 11, the conductor 40 is disposed on the inner side (inner circumferential side) of the conductor 330. The conductor 40 is disposed on the circumferential edges of the first middle legs 23*a* and 23*b* so as to enclose the first middle legs 23*a* and 23*b*, and the conductor 330 is disposed on the outer side (outer circumferential side) of the conductor 40 so as to enclose the conductor 40.

Figure 10:
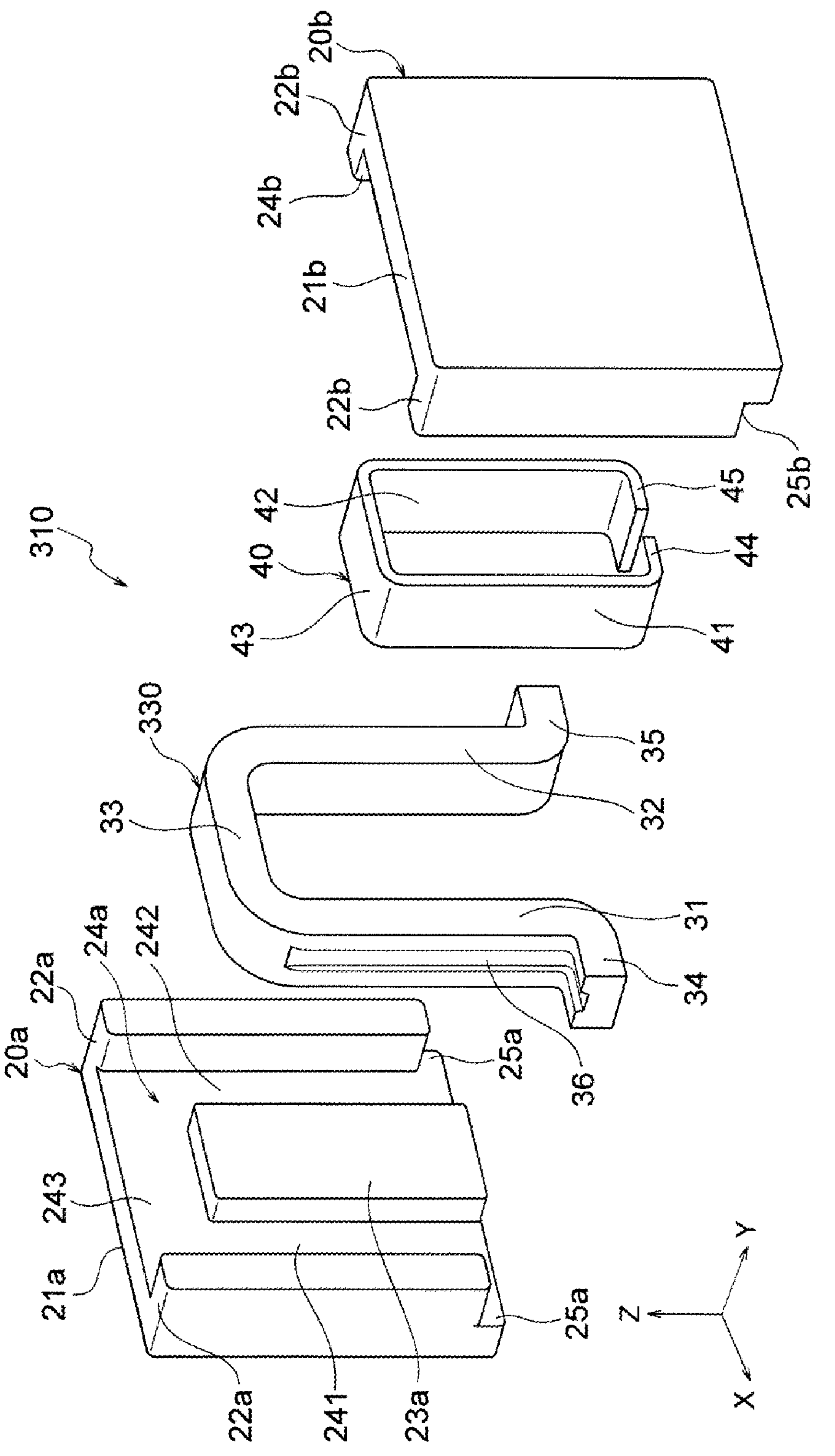
FIG. 10 is an exploded perspective view of a coil device according to Fourth Embodiment of the present invention.

As shown in FIG. 10, the conductor 330 is different from the conductor 30 shown in FIG. 2 in that the inner notch 38 is not formed on the back surface of the conductor 330. In the present embodiment, since the conductor 40 exists between the conductor 330 and the gap G3 (FIG. 1B), the conductor 330 does not face the gap G3 and is less likely to be affected by the leakage magnetic flux generated in the gap G3.

Incidentally, an insulating layer similar to the above-mentioned insulating layer formed on the conductor 40 may be formed on the surface of the conductor 330. Preferably, among the surfaces of the conductor 330, the insulating layer is formed on the inner surface (inner circumferential surface) of the conductor 330. Among the surfaces of the conductor 330, the insulating layer may cover the entire surface excluding the bottom surfaces of the first mounting part 34 and the second mounting part 35.

In the present embodiment, effects similar to those of First Embodiment can be obtained in the combined coil including the two conductors 330 and 40.

Incidentally, the present invention is not limited to the above-mentioned embodiments and can variously be modified within the scope of the present invention.

In First Embodiment, either one of the outer notch 36 (37) and the inner notch 38 may not be formed.

In First Embodiment, the position of the notches 36-38 in the Y-axis direction may be changed appropriately based on the position of the gaps G1-G3 in the Y-axis direction.

In First Embodiment, the first core 20*a* and the second core 20*b* are formed separately, but may be formed integrally and may function as a first core part and a second core part, respectively. This is also the case with Second Embodiment to Fourth Embodiment.

In First Embodiment, the mounting parts 34 and 35 are arranged between the first core 20*a* and the second core 20*b*, but may at least partly be arranged outside the cores 20*a* and 20*b*. This is also the case with Fourth Embodiment.

In First Embodiment, the notches 36-38 extend continuously in the extending direction of the conductor 30, but may extend intermittently in the extending direction of the conductor 30. This is also the case with Fourth Embodiment. In Second Embodiment, the notches 136 and 137 extend continuously in the extending direction of the conductor 130, but may extend intermittently in the extending direction of the conductor 130. This is also the case with Third Embodiment.

DESCRIPTION OF THE REFERENCE NUMERICAL

10, 110, 210, 310 . . . coil device
20*a*, 120*a*, 220*a* . . . first core
20*b*, 120*b*, 220*b* . . . second core
21*a* . . . first base
21*b* . . . second base
22*a*, 122*a*, 222*a* . . . first outer leg
22*a*1, 122*a*1, 222*a*1 . . . first outer leg edge
22*b* . . . second outer leg
22*b*1, 122*b*1 . . . second outer leg edge
23*a*, 223*a* . . . first middle leg
23*a*1, 223*a*1 . . . first middle leg edge
23*b* . . . second middle leg
23*b*1 . . . second middle leg edge
24*a*, 124*a* . . . first groove
24*b* . . . second groove
241 . . . first side part
242 . . . second side part
243 . . . upper part
244 . . . lower part
25*a* . . . first side groove
25*b* . . . second side groove
26*a* . . . step
30, 30', 130, 230, 230', 330, 40 . . . conductor
31, 41 . . . first conductor side part
32, 232, 42 . . . second conductor side part
33, 43 . . . conductor upper part
34, 134, 44 . . . first mounting part
35, 135, 45 . . . second mounting part
36, 136, 236 . . . first outer notch
37, 137, 237 . . . second outer notch
38 . . . inner notch

What is claimed is:

1. A coil device comprising:
a first core including a first leg;
a second core disposed with a gap between the first leg and the second core and separated from the first core; and
a conductor at least partly disposed between the first core and the second core,
wherein a notch is formed on the conductor at a position corresponding to the gap,
the conductor is an elongated body having an outer surface and an inner surface opposite to the outer surface,
the notch notches the outer surface without penetrating the elongated body from the outer surface to the inner surface,
the conductor includes a conductor side part extending along the first leg, and a mounting part being bent substantially perpendicularly to the conductor side part and extending outward along a bottom of the first leg,
the notch is formed continuously from the conductor side part to the mounting part,
the mounting part is arranged in a notch-shaped side groove formed at an end of the first leg of the first core,
a ratio of a width of the notch in a direction perpendicular to an extending direction of the notch to a width of the conductor in a direction perpendicular to an extending direction of the conductor is 0.3 to 0.5,
the notch-shaped side groove defines opening connecting an interior of the coil device with an exterior of the coil device,
the mounting part is arranged in the opening,
an end surface of the mounting part is exposed through the opening to the exterior of the coil device, and
the ratio remains 0.3 to 0.5 in the opening.

2. The coil device according to claim 1, wherein the notch is formed on the conductor along an edge of the first leg next to the conductor.

3. The coil device according to claim 1, wherein a depth of the notch is larger than a width of the gap.

4. The coil device according to claim 1, wherein
the second core includes a second leg disposed opposite to the first leg, and
the notch is formed on the conductor at a position corresponding to the gap formed between the first leg and the second leg.

5. The coil device according to claim 2, wherein
the second core includes a second leg disposed opposite to the first leg, and
the notch is formed on the conductor at a position corresponding to the gap formed between the first leg and the second leg.

6. The coil device according to claim 4, wherein the notch is made of a concave groove.

7. The coil device according to claim 1, wherein
the second core has a flat plate shape, and
the notch is formed on the conductor at the position corresponding to the gap formed between the first leg and the second core.

8. The coil device according to claim 2, wherein
the second core has a flat plate shape, and
the notch is formed on the conductor at the position corresponding to the gap formed between the first leg and the second core.

9. The coil device according to claim 7, wherein the notch is made of a chamfered portion obtained by chamfering a side of the conductor.

10. The coil device according to claim 1, wherein
the first leg includes a pair of outer legs and a middle leg disposed between the pair of outer legs, and
the notch is formed on the conductor at the position corresponding to the gap formed between the second core and at least either one of the outer legs and the middle leg.

11. The coil device according to claim 2, wherein
the first leg includes a pair of outer legs and a middle leg disposed between the pair of outer legs, and
the conductor includes the notch at the position corresponding to the gap formed between the second core and at least either one of the outer legs and the middle leg.

12. The coil device according to claim 1, wherein
the conductor has a curved shape, and
the notch is formed on at least either one of an inner circumferential side and an outer circumferential side of the conductor.

13. The coil device according to claim 1, wherein
the mounting part is configured to be connected to an external circuit, and
the notch is partly formed in the mounting part.

14. The coil device according to claim 1, wherein a ratio of a width in a direction perpendicular to an extending direction of the notch to a width of the gap is 0.5-10.

15. The coil device according to claim 1, wherein a ratio of a depth of the notch to a thickness of the conductor between the outer surface and the inner surface is 0.1-0.5.

16. The coil device according to claim 1, wherein a ratio of a depth of the notch to a width of the gap is 0.5-5.

17. A coil device comprising:

a first core including a first leg;

a second core disposed with a gap between the first leg and the second core; and a plate-shaped conductor at least partly disposed between the first core and the second core and having an outer surface and an inner surface opposite to the outer surface, wherein a notch is formed on the outer surface of the conductor at a position corresponding to the gap, the notch has a first notch part and a second notch part apart from the first notch part along an extending direction of the conductor, the conductor includes a conductor side part extending along the first leg, and a mounting part being bent substantially perpendicularly to the conductor side part and extending outward along a bottom of the first leg, the first notch part is formed continuously from the conductor side part to the mounting part, the mounting part is arranged in a notch-shaped side groove formed at an end of the first leg of the first core, a ratio of a width of the notch in a direction perpendicular to an extending direction of the notch to a width of the conductor in a direction perpendicular to an extending direction of the conductor is 0.3 to 0.5, the notch-shaped side groove defines opening connecting an interior of the coil device with an exterior of the coil device, the mounting part is arranged in the opening, an end surface of the mounting part is exposed through the opening to the exterior of the coil device, and the ratio remains 0.3 to 0.5 in the opening.

18. A coil device comprising:

a first core including first legs;

a second core disposed with gaps between the first legs and the second core; and a conductor at least partly disposed between the first core and the second core, wherein notches are formed on the conductor at a position corresponding to all of the gaps, the conductor includes a conductor side part extending along the first leg, and a mounting part being bent substantially perpendicularly to the conductor side part and extending outward along a bottom of the first leg, at least a portion of the gaps is disposed at the bottom of the first leg, the mounting part is arranged in a notch-shaped side groove formed at an end of the first leg of the first core, a ratio of a width of the notch in a direction perpendicular to an extending direction of the notch to a width of the conductor in a direction perpendicular to an extending direction of the conductor is 0.3 to 0.5, the notch-shaped side groove defines opening connecting an interior of the coil device with an exterior of the coil device, the mounting part is arranged in the opening, an end surface of the mounting part is exposed through the opening to the exterior of the coil device, and the ratio remains 0.3 to 0.5 in the opening.

19. The coil device according to claim 18, wherein the notches have an inner notch formed on an inner circumferential surface of the conductor and an outer notch formed on an outer circumferential surface of the conductor.

* * * * *